(12) United States Patent
Odaka et al.

(10) Patent No.: US 6,509,695 B2
(45) Date of Patent: Jan. 21, 2003

(54) FLASH APPARATUS AND CAMERA HAVING THE FLASH APPARATUS

(75) Inventors: Yukio Odaka, Kanagawa (JP); Shoji Ichimasa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 36 days.

(21) Appl. No.: 09/841,197

(22) Filed: Apr. 24, 2001

(65) Prior Publication Data

US 2002/0047626 A1 Apr. 25, 2002

(30) Foreign Application Priority Data

Apr. 27, 2000 (JP) .......................... 2000-128419
Jul. 17, 2000 (JP) .......................... 2000-216304

(51) Int. Cl.[7] .............................................. H05B 37/02
(52) U.S. Cl. ................................ 315/241 R; 315/241 P; 396/206
(58) Field of Search ...................... 315/200 A, 241 R, 315/241 P, 241 S; 396/206, 205

(56) References Cited

U.S. PATENT DOCUMENTS 5,523,654 A * 6/1996 Sikora et al. ............... 315/219

* cited by examiner

*Primary Examiner*—David Vu
(74) *Attorney, Agent, or Firm*—Robin, Blecker & Daley

(57) ABSTRACT

In a flash apparatus, when it is determined that the oscillation of a voltage boosting circuit is stopped before it is controlled so as to stop, it is possible to continuously charge a voltage to a main capacitor by causing the voltage boosting circuit to continue oscillation by providing a control circuit for oscillating the voltage boosting circuit again. Further, the flash apparatus includes a charged current detecting circuit for detecting the current charged in a main capacitor using an auxiliary power source as a power source. The charged current detecting circuit is simply arranged with a passive element for bypassing a part of the current charged in the main capacitor from a loop through the above-mentioned auxiliary power source.

18 Claims, 25 Drawing Sheets

FLASH APPARATUS AND CAMERA HAVING THE FLASH APPARATUS

BACKGROUND OF THE INVENTION

1. Field of the Invention

The present invention relates to a flash apparatus for photography or the like, and to a camera having the flash apparatus.

2. Description of Related Art

A conventional flash apparatus will be schematically explained as to its arrangement and operation with reference to FIGS. 4 and 5. FIG. 4 is a circuit diagram showing the arrangement of the conventional flash apparatus. FIG. 5 is a flowchart showing the operation of the conventional flash apparatus in a flash mode.

First, a control circuit (not shown) operates a charge inhibition timer for interrupting an operation for charging a main capacitor 21 (step S401). Next, the control circuit applies an H level signal through a terminal a to start oscillation and further applies an L level signal (pulse signal) to a terminal b (step S402).

The H level signal applied to the terminal a acts as the base current of a transistor 9 through a resistor 6, which makes the transistor 9 conductive. As a result, one input terminal of a NOR circuit 12, which has been pulled up by an auxiliary power source Vcc 23 through a resistor 7, becomes an L level. In contrast, since the terminal b is momentarily set to an L level, the other end of the NOR circuit 12 also becomes an L level. With this operation, the output of the NOR circuit 12 becomes an H level, and potential is applied to a resistor 15.

Since this potential is connected to the gate terminal of an FET 14, the FET 14 is conducted by receiving a gate driving voltage. The conduction of the FET 14 causes a current to flow from a battery 1 to the primary winding P of an oscillation transformer 13. Thus, an electromotive force is induced in the secondary winding S of the oscillation transformer 13 so that a current flows through a loop composed of a high voltage rectifying diode 17, a main capacitor 21, and a rectifying element 16.

Since the cathode potential of the rectifying element 16 is lower than the anode potential thereof by about 0.7 V, a current flows from the auxiliary power source Vcc 23 through resistors 10 and 11. With this operation, since potential connected to a midpoint between the resistors 10 and 11 becomes an L level, the L level can be maintained even after the terminal b momentarily becomes the L level.

When the conduction of the FET 14 is continued and the magnetic flux of the core of the oscillation transformer 13 is saturated, a counter electromotive force is generated and the current charged in the main capacitor 21 is exhausted as well as no current flows from the auxiliary power source Vcc 23 to the resistors 10 and 11, which sets one input terminal of the NOR circuit 12 to an H level so that the output from the NOR circuit 12 becomes an L level.

When the output from the NOR circuit 12 becomes the L level, the gate charge of the FET 14 becomes an L level, which makes the FET 14 non-conductive momentarily. While the counter electromotive force is generated by receiving a reverse bias due to the capacitance of the high voltage rectifying diode 17, potential higher than that of the auxiliary power source Vcc 23 is generated to the cathode of the rectifying element 16.

When the magnetic flux of the core is reduced and the counter electromotive force is reversed to a forward oscillation voltage, the rectifying element 16 receives a bias voltage again and the cathode potential thereof is reduced, whereby a current flows from the auxiliary power source 23 to the resistor 11 through the resistor 10 and the input terminal of the NOR circuit 12 becomes an L level, which conducts the FET 14 again.

Oscillation is executed by repeating the above actions so that the voltage charged in the main capacitor 21 is increased.

While the main capacitor 21 is charged, the control circuit causes a voltage detecting circuit 18 to output the information of the voltage charged in the main capacitor 21 through a terminal d and determines whether or not the charged voltage has reached a predetermined charge completion voltage (step S403).

When the voltage charged in the main capacitor 21 has reached the predetermined charge completion voltage, the control circuit interrupts the charging operation of the main capacitor 21 by stopping the H level signal outputted through the terminal a (step S405). Next, the control circuit completes the charging operation by setting a charge completion flag (step S406).

Otherwise, when the voltage charged in the main capacitor 21 has not reached the charge completion voltage, the control circuit determines whether or not the abovementioned charge inhibition timer has reached a predetermined count completion value (step S404). When the charge inhibition timer has not reached the predetermined charge completion value, the control circuit returns to step S403, whereas when the charge inhibition timer has reached the predetermined charge completion value, the control circuit interrupts the charging operation of the main capacitor 21 by stopping the H level signal outputted through the terminal a (step S407). Next, the control circuit completes the charging operation by setting a charge NG flag indicating the charge NG (step S408).

However, as the voltage of the battery drops, a power source voltage compensating circuit temporarily stops the oscillating operation of an oscillation circuit temporarily. As a result, a secondary current is reduced. Further, when the power source voltage compensating circuit stops the oscillating operation just before the oscillation transformer is saturated, the secondary current is more reduced. As a result, there is a possibility that the oscillating operation of the voltage boosting circuit is perfectly stopped.

Further, the conventional flash apparatus measures the voltage charged in the main capacitor every time a predetermined time passes and detects a problem in an charging operation from a result of the measurement. However, the conventional flash apparatus cannot detect abnormal states, for example, discharge of a large current due to short-circuit of the main capacitor, breakage of a charged voltage detection wiring, a voltage excessively charged in the main capacitor, and the like at an early time.

An object according to a first aspect of the invention is to provide a flash apparatus capable of detecting the operating state of a voltage boosting circuit at an early time and controlling the operation of the voltage boosting circuit according to the operating state and to provide a camera having the flash apparatus.

Further, the conventional flash apparatus ordinarily emits a discharge tube to illuminate, for example, a subject in such a manner that the voltage of a battery is increased using a bipolar transistor as an oscillation transistor, a charge having an increased voltage is accumulated in a main capacitor and discharged through the discharge tube.

Since the bipolar transistor has a low operating voltage and a present DC/DC converter is of a current feedback type, it is possible to flow the current charged in the main capacitor through a loop between the base and emitter of the oscillation transistor. Thus, there is an advantage that the number of parts can be considerably reduced.

However, as the sizes of cameras become smaller, the number of batteries used thereby is reduced, and, at present, cameras employ 3 V power sources in many cases, while they conventionally employed 6 V power sources.

Further, recent compact cameras are required to have large guide numbers to be provided with a zoom function and to expand a photographing region.

Therefore, bipolar transistors used for oscillation are required to have such a performance that they have higher hEF, a lower saturated voltage VCE (sat) between an emitter and a collector and further a larger current-carrying capacity. Accordingly, at present, bipolar transistors, which can satisfy these requirements, are limited.

In contrast with these bipolar transistors, FETs acting as insulated gate type transistors recently have greatly improved performances with a gate driving voltage for conducting them reduced to 2.5 to 4 V. Further, there are available devices having an operating resistance of about 20 to 30 mΩ in conduction. Further, since many devices have a current-carrying capacity of 5 to 10 A, they can be sufficiently used as oscillation devices for flash apparatuses.

FETs can sufficiently cope with a tendency, which is expected hereinafter, of further reducing a voltage of power sources such as batteries and the like because they can be operated as long as a gate driving voltage is guaranteed, while bipolar transistors are required to have the high hFET.

FIG. 26 shows a conventional example using an FET. Reference numeral 301 denotes a battery acting as a power source, reference numeral 360 denotes a power source stabilizing capacitor connected to both the ends of the battery 301, reference numeral 312 denotes a transformer for increasing the voltage of the battery 301 one terminal f of the primary winding which is connected to the positive electrode of the battery 301, the other terminal f of the primary winding is connected to the drain of an N-channel field effect transistor (hereinafter, abbreviated as FET) 313 acting as a switch element (which will be to be described later). Further, one terminal h of the secondary winding of the FET 313 is connected to the anode of a rectifying diode 315 to be described later and the other terminal i of the secondary winding is connected to the base of a PNP transistor 381 (which will be to be described later).

Further, the source of the FET 313 is connected to the negative electrode of the battery 301, and the gate thereof is connected to the output of a logic circuit 337 acting as one of active elements serving as a control unit (which will be described later).

The logic circuit 337 is composed of, for example, an AND logic. It is to be noted that the active element is an ordinary IC which uses an output Vcc from a constant voltage circuit (power source) 420 (which will be described later) as a power source. The active element is arranged to be a driver circuit for driving the gate of the above-mentioned FET 313, to stabilize the gate voltage and to improve the rise and fall characteristics of an on-off time control.

One of the inputs of the active element 337 receives the output of a current-voltage conversion unit 348 to be described later, and the other of the inputs is arranged as a signal input from a signal terminal CGCOM. The output of the active element 337 of the control unit is connected to the gate of the FET 313.

The active element 337 of the control unit outputs a high level (hereinafter, abbreviated as "HL") signal only when both the outputs of the current-voltage conversion unit 348 and the signal CGCOM are at "HL".

The active element 337 outputs a low level (hereinafter abbreviated to "LL") signal when the signal CGCOM becomes "LL". The current-voltage conversion unit 348 is composed of a PNP transistor 381, a protective resistor 382, a capacitor 383 and a resistor 384.

The current-voltage conversion unit 348 is arranged to convert a current flowing from the secondary winding of the transformer 312 to a main capacitor 320 into a driving voltage for the switch element. The emitter of the PNP transistor 381 is connected to the output Vcc of a constant voltage circuit 420 (which will be described later) and the base thereof is connected to the terminal i of the secondary winding of the transformer 312. The protective resistor 382 is connected between the emitter and base of the PNP transistor 382, and the capacitor 383 also is connected therebetween. Further, the resistor 384 has one end connected to the base of the PNP transistor 381 and the other end connected to the negative electrode of the battery 301. When a base current of the PNP transistor 381 is pulled during oscillation, a current which is proportional to the base current flows between the emitter and collector of the PNP transistor 381 to bring about an electromotive force at the resistor 384, so that the current is converted into a voltage. A resistor 361 is a flow limit resistor connected between the base of the PNP transistor 381 and the CGST terminal of a control circuit 425.

A resistor 347 has one end connected to the CGCOM terminal of the control circuit 425 and the other terminal connected to the input of the active element 337 of the control unit.

Reference numeral 341 denotes an operation stabilizing capacitor connected between the output Vcc of the constant voltage circuit 420 and the negative electrode of the battery 301, and reference numeral 393 denotes an output voltage maintaining unit as a known output voltage maintaining circuit for maintaining the output voltage. (Vcc voltage) of the constant voltage circuit 420 when the voltage of the battery drops in a charging operation. When an input voltage (from the battery) suddenly drops like in the case of charging, the output voltage maintaining unit 393 cannot maintain its output voltage. Therefore, the output voltage maintaining unit 393 is arranged to cut off the control signal CGCOM when the input voltage becomes lower than a power-source-voltage cut-off level (hereinafter, abbreviated as Vref voltage) set by the constant voltage circuit 420.

Reference numeral 302 denotes a resistor having one end connected to the positive electrode of the battery 301 and the other end connected to the non-inverting input terminal of a comparator 304 (which will be described later). Reference numeral 303 denotes a capacitor having one end connected to the non-inverting input terminal of the comparator 304 and the other end connected to the negative electrode of the battery 301. This capacitor 303 is arranged to have hysteresis with respect to its input. The comparator 304 is arranged, in this case, to have an open-collector-type output. To the non-inverting input terminal of the comparator 304 is connected the other end of the resistor 302 and one end of the capacitor 303. The inverting input terminal of the comparator 304 is supplied with the power-source-voltage cut-off level voltage (Vref voltage) from the constant voltage circuit 420. Further, the output of the comparator 304 is connected to one end of the resistor 347 and the input of the active element 337.

A specific operation of the conventional example is such that, first, an input voltage is determined as the power-source-voltage cut-off level voltage Vref which is set by the constant voltage circuit 420 and supplied to the inverting input terminal of the comparator 304.

The non-inverting input terminal of the comparator 304 detects the voltage of the battery 301 through the resistor 302. When an voltage increasing operation is started in this state, the control circuit 425 changes the oscillation start signal CGCOM from "LL" to "HL". The input of the active element 337 becomes Thereafter, a one-shot signal, which changes from an "OPEN" state to an "LL" state for a very short period of time, is outputted from the CGST terminal of the control circuit 425 through the resistor 361. With this operation, the base current of the PNP transistor 381 is pulled.

When the base of the PNP transistor 381 of the current-voltage conversion unit 348 is pulled, the transistor 381 is turned on, a current flows from its emitter connected to the Vcc voltage terminal to its collector, and a voltage is generated to both the ends of the resistor 384.

Thus, both the inputs of the active element 337 become "HL", whereby the output thereof becomes "HL". As a result, the FET 313 is turned on, and the current of the battery 301 flows from the drain to source of the FET 313 through the terminals e and b of the primary winding of the transformer 312, which causes the current to flow on the primary side of the transformer 312 to thereby generate a voltage, which is proportional to a winding ratio, to the secondary side thereof as well as pulls the base current of the PNP transistor 381 connected to the terminal h of the secondary winding of the transformer 312.

From the Vcc constant voltage source, a current is supplied to the transformer 312 through the emitter and base of the PNP transistor 381 and to the main capacitor 320 through the high voltage rectifying diode 315. As the current increases, the transformer 312 is magnetically saturated and the current is rapidly attenuated. With this operation, the base current of the PNP transistor 381 is not pulled and a current which is proportional thereto flows between the emitter and collector of the PNP transistor 381 to thereby drop the voltage by the resistor 384 (voltage-current conversion). Therefore, the output of the active element 337 becomes "LL", and the gate of the FET 313 becomes "LL" so as to turn off it, and the supply of the electric power from the battery 301 to the terminal e of the primary wining of the transformer 312 is cut off.

However, since the secondary current of the transformer 312 executes damped oscillation, the voltage at both the ends of the resistor 384 in the current-voltage conversion unit 348 is increased again and the inputs of the active element 337 of the control unit become "HL" together, the output of the active element 337 of the control unit becomes "HL". As a result, the FET 313 is turned on and the current of the battery power source 301 flows to the drain and source of the FET 313 through the terminals f and g of the transformer 312 so as to flow a current to the primary side thereof, so that oscillation is repeated similarly to the above-mentioned. Thus, a charge is accumulated in the main capacitor 320 and a voltage is increased.

At this time, the voltage of the battery 301 rapidly drops because the FET 313 is turned on. However, when the voltage drops below the Vref voltage of the input of the comparator 304, the comparator 304 is reversed from an open state to an "LL" state, thereby reducing the output of the charge control signal CGCOM of the control circuit 425. Thus, one input of the active element 337 becomes "LL" to set the output thereof to "LL", so that the FET 313 is turned off, and oscillation begins to be interrupted.

With the oscillation stopped, the voltage of the battery 301 ceases to drop and comes to recover. With the voltage of the battery 301 thus coming to recover, when the voltage of the battery 301 exceeds the voltage Vref of the input of the comparator 304, the output of the comparator 304 changes from the "LL" state to the open state. Accordingly, the input of the active element 337 becomes "HL" to bring the output thereof to "HL" again. Therefore, the FET 313 is turned on to resume oscillation. The voltage of the power source is thus prevented from becoming less than a predetermined voltage by repeating the actions in above manner.

However, in the above-mentioned conventional flash apparatus, the charged current, which flows to the main capacitor 320, flows to a loop composed of the terminal h of the secondary winding of the transformer 312, the main capacitor 320, the constant voltage circuit 420, the emitter to base of the transistor 381, and the terminal i of the secondary winding of the transformer 312.

Since this current flows through the constant voltage circuit 420, a large current capacity is required to the constant voltage circuit 420. When a power source voltage is 6 V, an ordinary flash apparatus is supplied with an average current of about 6 A from a battery. When there is no loss, a current of 1/(secondary winding ratio of a transformer) flows on the secondary side thereof.

$$Ib=Ic/n$$

where, Ib shows a secondary current, Ic shows a primary current, and n shows a winding ratio.

When the winding ratio of the transformer is 100 (n), it can be calculated that the transformer has a supply capacity of about 60 mA. There is a drawback that a larger current supply capacity is required when currents consumed by other control circuits are added.

Accordingly, an object according to a second aspect of the invention is to provide a flash apparatus capable of suppressing a current supply capacity.

BRIEF SUMMARY OF THE INVENTION

One aspect of the invention resides in that when it is determined that the oscillation of a voltage boosting circuit is stopped before it is controlled so as to stop, it is possible to continuously charge a voltage to a main capacitor by causing the voltage boosting circuit to continue oscillation by providing a control circuit for oscillating the voltage boosting circuit again.

Further, another aspect of the invention is a flash apparatus which includes a charged current detecting circuit for detecting the current charged in a main capacitor using an auxiliary power source as a power source. The charged current detecting circuit is simply arranged with a passive element for bypassing a part of the current charged in the main capacitor from a loop through the above-mentioned auxiliary power source so as to suppress electric power supplied from the auxiliary power source to a low level.

These and further aspects and features of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

First Embodiment

Figure 1:
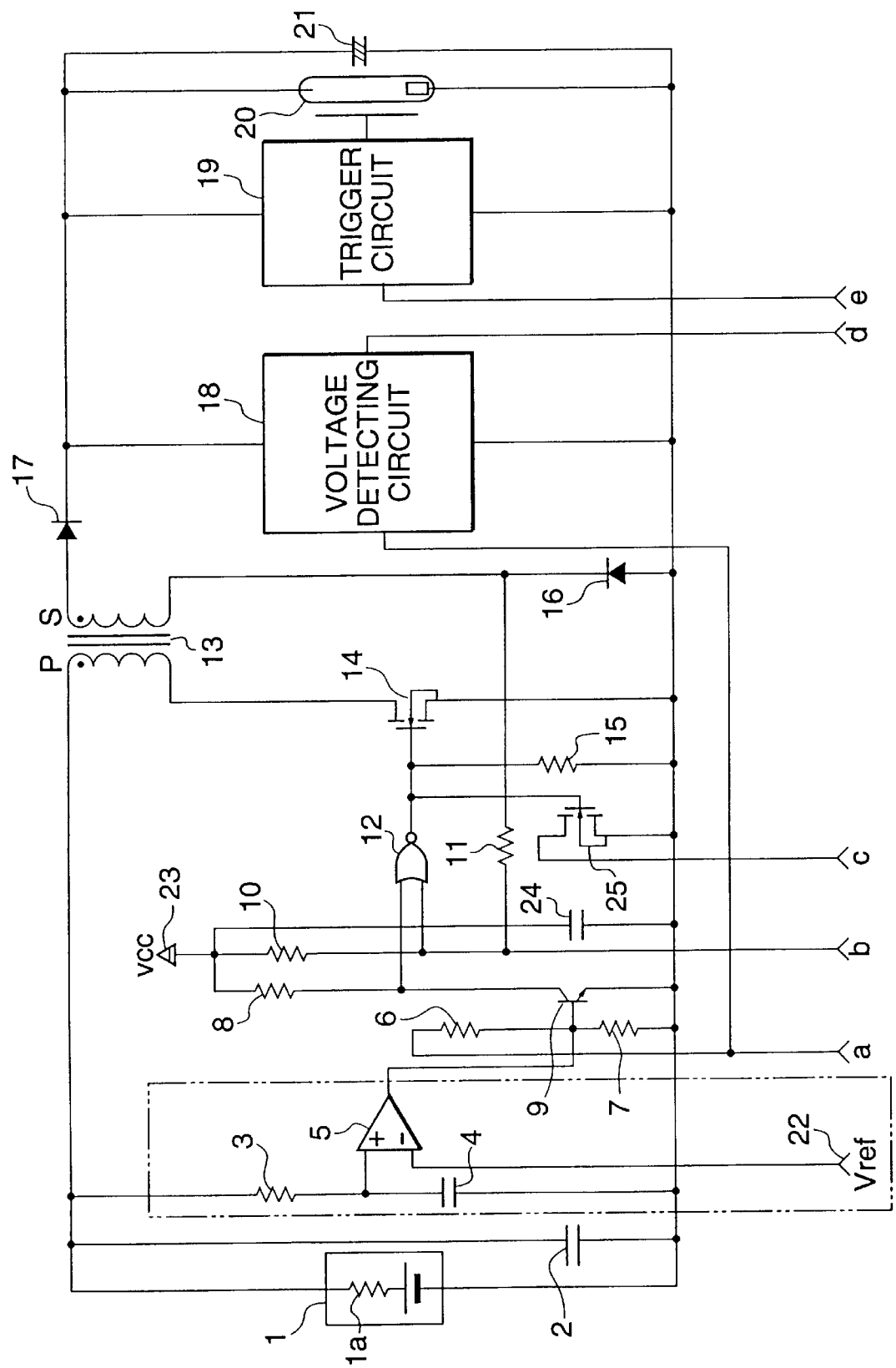
FIG. 1 is a circuit diagram showing the arrangement of a flash apparatus as a first embodiment of the present invention.

FIG. 1 is a circuit diagram showing the arrangement of a flash apparatus as a first embodiment of the invention.

Reference numeral 1 denotes a power source battery having an internal resistor 1a, reference numeral 2 denotes a power source capacitor connected to the power source battery 1 in parallel therewith, reference numeral 3 denotes a resistor, reference numeral 4 denotes a capacitor connected to the resistor 3 in series therewith, and reference numeral 5 denotes a comparison circuit having a positive terminal connected between the resistor 3 and the capacitor 4 and a negative terminal connected to a reference power source Vref 22. The series circuit composed of the resistor 3 and the capacitor 4 is connected to the power source battery 1 in parallel therewith. The resistor 3, the capacitor 4 and the comparison circuit 5 constitute a power source voltage compensating circuit for compensating the voltage of the power source battery 1.

Reference numerals 6 and 7 denote resistors connected to each other in series, reference numeral 9 denotes a transistor connected between the resistors 6 and 7 and having a base terminal connected to the output terminal of the comparison circuit 5. The resistor 6 is connected to restrict the base current of the transistor 9. Reference numerals 8 and 10 denote NOR gate input pull-up resistors connected between an auxiliary power source Vcc 23 and the respective input terminals of a NOR circuit 12. Reference numeral 24 denotes a power source capacitor of the auxiliary power source Vcc 23.

Reference numeral 11 denotes an input protective resistor of the NOR circuit 12. Reference numeral 13 denotes an oscillation transformer, reference numeral 14 denotes an FET (oscillation switch), reference numeral 15 denotes a pull-down resistor of the gate of the FET 14. An end of the primary winding P of the oscillation transformer 13 is connected to the positive electrode of the power source battery 1 and the other end thereof is connected to the drain of the FET 14. The source of the FET 14 is connected to the negative electrode of the power source battery 1.

A series circuit composed of a high voltage rectifying diode 17, a main capacitor 21, and a rectifying element 16 is connected to the secondary winding S of the oscillation transformer 13. Reference numeral 18 denotes a voltage detecting circuit connected to the main capacitor 21 in parallel therewith to detect the voltage charged in the main capacitor 21, and reference numeral 19 denotes a trigger circuit connected to the main capacitor 21 in parallel therewith to apply a high voltage trigger pulse to a discharge tube connected to the main capacitor 21 in parallel therewith in response to a light emission signal from a control circuit of a camera.

Reference numeral 25 denotes an FET which has a gate connected to the output of the NOR circuit 12, a source connected to the ground, and a drain connected to the control circuit of the camera. Reference symbols a to e denote control terminals connecting between the control circuit of the camera and the flash apparatus. As will be described later, the control circuit controls the flash apparatus through the connecting terminals a to e.

Figure 2:
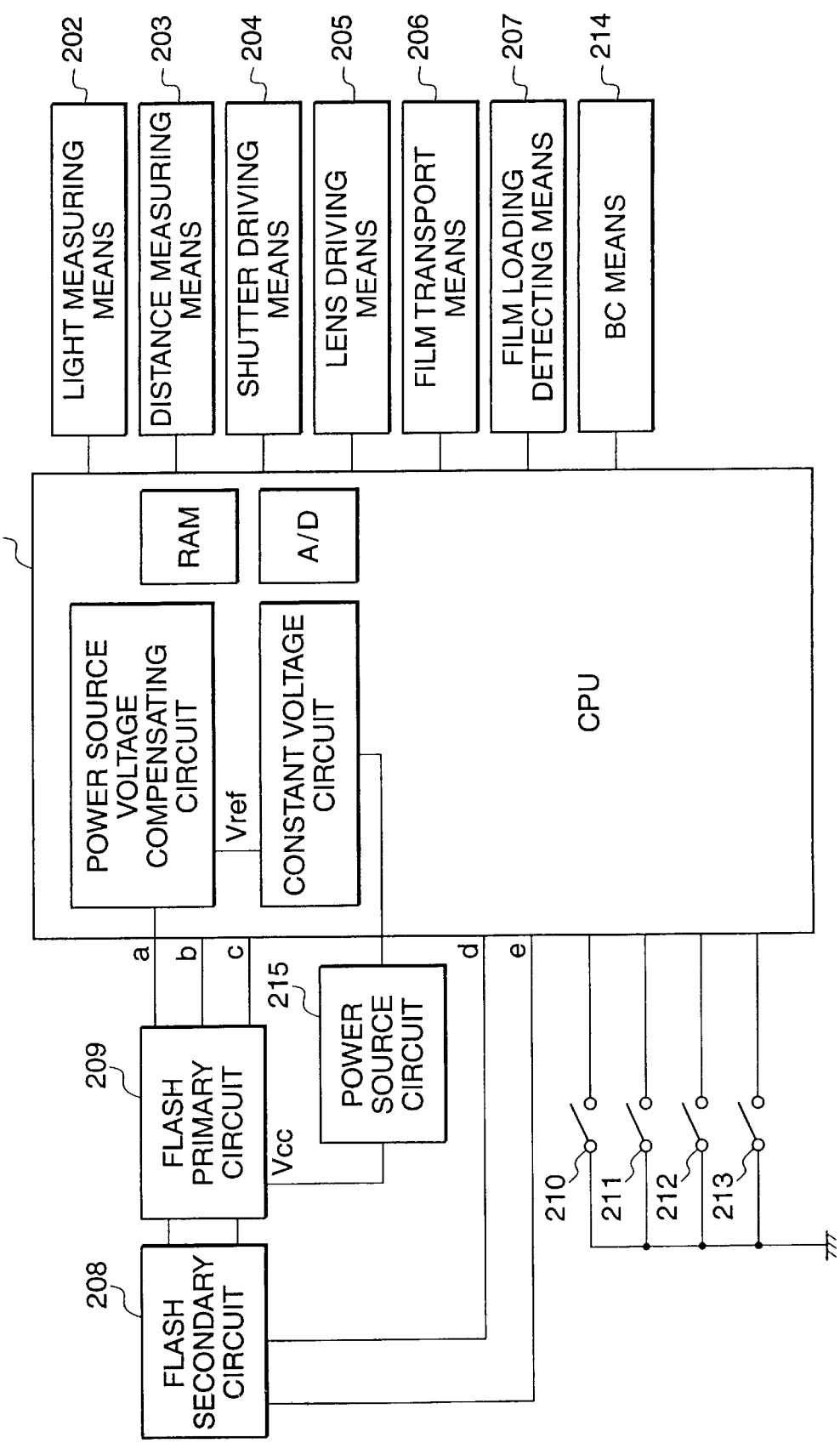
FIG. 2 is a block diagram showing the arrangement of a camera having the flash apparatus of the present invention.

Next, the sequence of the camera having the flash apparatus will be described with reference to FIG. 2. FIG. 2 is a block diagram showing the arrangement of the camera having the flash apparatus.

Reference numeral 201 denotes the control circuit (also referred to as CPU). The control circuit 201 sequentially controls the camera as a whole and includes a RAM which stores various kinds of detected information, an A/D circuit which digitizes an analog signal, a constant voltage circuit which generates a constant voltage, and the above-mentioned power source voltage compensating circuit which controls the voltage of the auxiliary power source Vcc 23.

Reference numeral 202 denotes a light measuring means for detecting the degree of luminance of a subject, reference numeral 203 denotes a distance measuring means for detecting a distance to the subject, reference numeral 204 denotes a shutter drive means for controlling the opening of a shutter based on a result detected by the light measuring means 202, reference numeral 205 denotes a lens drive means for focusing the subject on the surface of a photographic film by driving a photographing lens based on a result detected by the distance measuring means 203, reference numeral 206 denotes a film transport means 206 for automatically loading, winding and rewinding the photographic film.

Reference numeral 207 denotes a film loading detecting means 207 for detecting whether or not a photographic film is loaded on the camera, and reference numeral 208 denotes a flash secondary circuit for emitting the flash apparatus when a picture is taken with flash. The flash secondary circuit 208 is composed of the rectifying element 16, including the oscillation transformer 13 shown in FIG. 1, the high voltage rectifying diode 17, the voltage detecting circuit 18, the trigger circuit 19, the discharge tube 20, and the main capacitor 21.

Reference numeral 209 denotes a flash primary circuit for charging the main capacitor 21. The flash primary circuit 209 is composed of the resistors 6, 7, and 8, the transistor 9, the resistors 10 and 11, the NOR circuit 12, the oscillation transformer 13, the FET 14, the resistor 15, and the FET 25.

Reference numeral 210 denotes a main switch MAINSW for putting the camera in a photographing stand-by state, reference numeral 211 denotes a switch SW1 for measuring light, distance, and the like by starting an electric circuit in the camera in response to depression of a shutter button to a first stroke position, reference numeral 212 denotes a switch SW2 for issuing a signal for starting photographing sequences after the switch SW1 is turned on in response to depression of the shutter button to a second stroke position, reference numeral 213 denotes a back lid switch for detecting whether the back lid of the camera is opened or closed, reference numeral 214 denote a BC means (battery checker) 214 for detecting the voltage of the battery, and reference numeral 215 denotes a power source circuit for generating electric power in the constant voltage circuit in the CPU 201 so that it can be used in a control system such as the CPU and the like.

Figure 6:
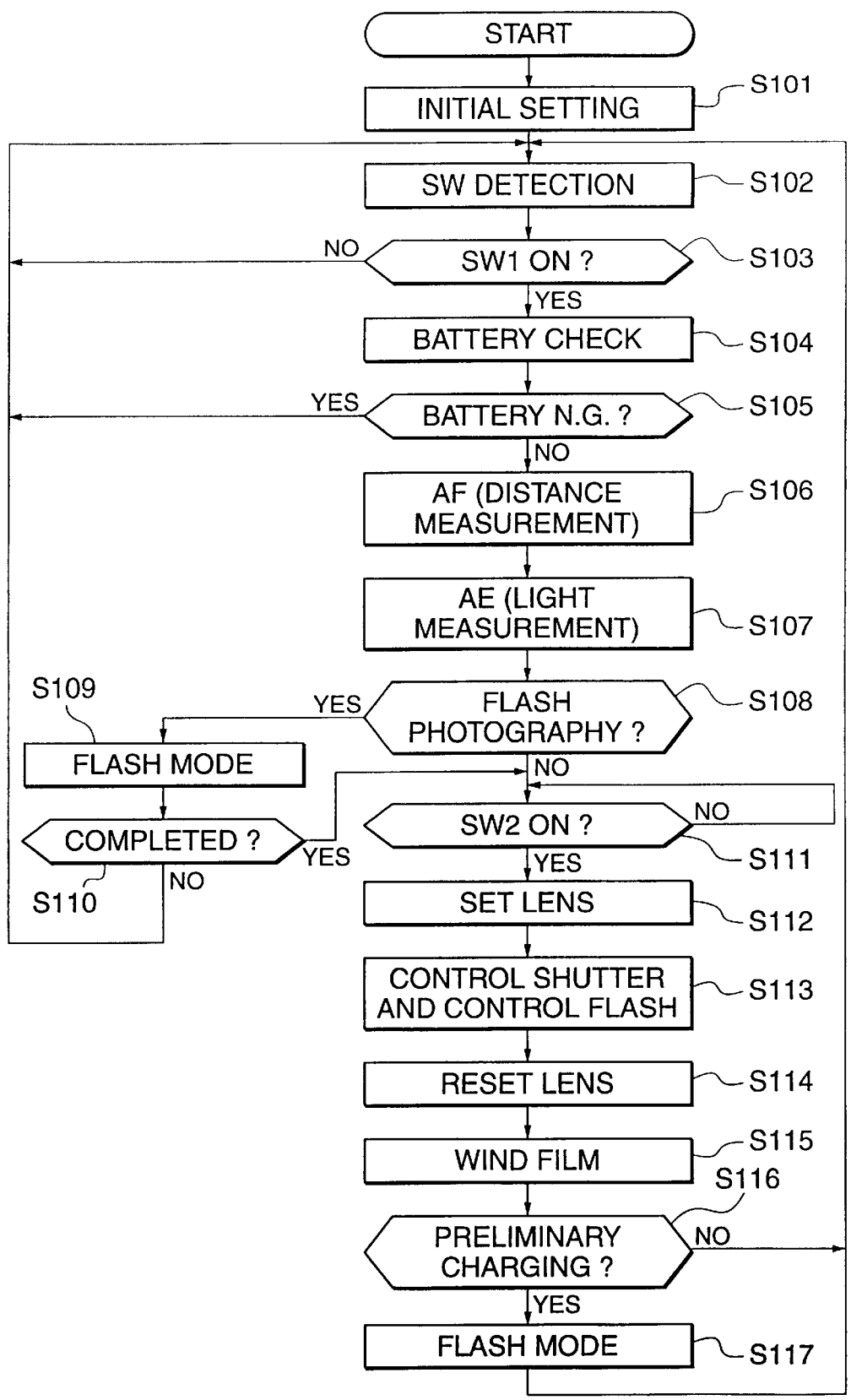
FIG. 6 is a flowchart showing an overall sequence of the camera of the present invention.

Next, the sequence of the camera arranged as described above will be described with reference to FIG. 6. FIG. 6 is a flowchart showing the sequence of the camera.

First, the control circuit 201 initializes a microcomputer (S101). Next, the control circuit 201 detects a state of the switch SW1 (state of the release button depressed to the first stroke position (semi-depressed state)) (step S102) to determine whether or not the switch SW1 is turned on (step S103). When the control circuit 201 does not detect that the switch SW1 is turned on, the control circuit 201 returns to step S102, whereas when the control circuit 201 detects that the switch SW1 is turned on, the control circuit 201 detects the voltage of the battery 1 through the BC means 214 (step S104) and stores a result of detection in the RAM of the CPU 201.

Next, the control circuit 201 determines whether or not the voltage of the battery detected at step S104 is a voltage capable of operating the camera (step S105). When the voltage of the battery 1 is low and cannot guarantee the operation of the camera, the control circuit 201 recognizes this state as BCNG and returns to step S102 to detect the state of the switch SW1. Whereas, when the camera can be operated by the voltage of the battery 1, the control circuit 201 executes automatic focusing (AF) through the distance measuring means 203 (step S106) and stores a result of measurement in the RAM of the CPU 101.

Next, the control circuit 201 executes automatic exposing (AE) through the light measuring means 202 and stores a result of it in the RAM similarly to AF. Next, the control circuit 201 determines whether or not the flash apparatus must be emitted for photographing based on the result of light measurement detected at step S107 (step S108). When the control circuit 201 determines it unnecessary to emit the flash apparatus, the control circuit 201 goes to step S111 (which will be described later). Further, when the control circuit 201 determines it necessary to emit the flash apparatus (for example, a low degree of luminance, back light, and the like), the control circuit 201 goes to a flash mode (step S109).

Figure 7:
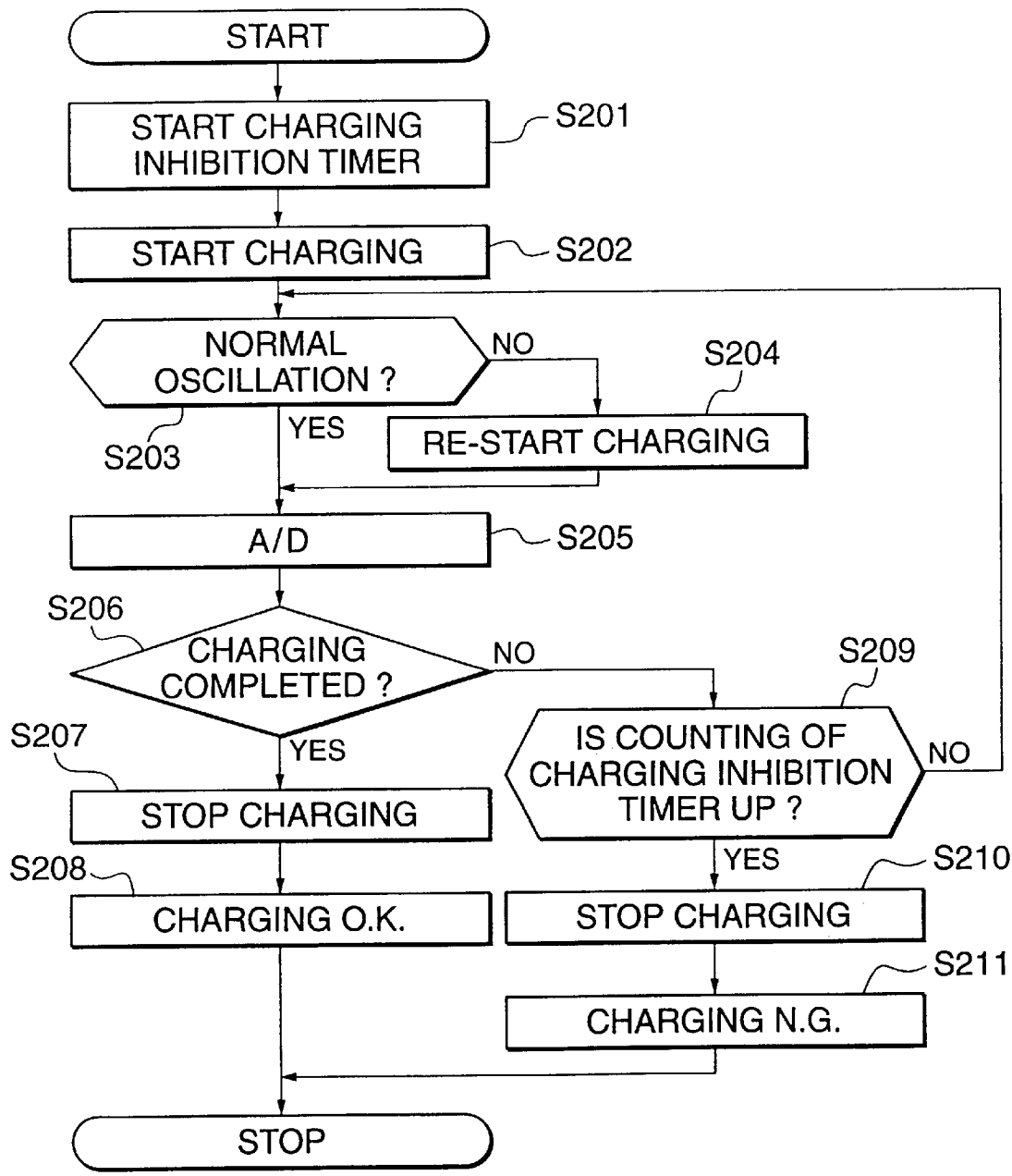
FIG. 7 is a flowchart showing a flow of a flash mode as the first and second embodiments of the present invention.

The operation in the flash mode will be described here with reference to FIG. 7. FIG. 7 is a flowchart showing a flow of the operation in the flash mode.

First, the control circuit 201 operates a charge inhibition timer to interrupt an operation for charging the main capacitor 21. Next, the control circuit 201 applies an H level signal through the terminal e to start oscillation and further applies an L level signal (pulse signal of about several tens of microseconds) to the terminal b (step S202).

The H level signal applied to the terminal e acts as the base current of the transistor 9 through the resistor 6, which makes the transistor 9 conductive. As a result, one input terminal of the NOR circuit 12, which has been pulled up by the auxiliary power source Vcc 23 through the resistor 7, becomes an L level. In contrast, the other terminal of the NOR circuit 12 also becomes an L level by momentarily setting the terminal b to an L level. With this operation, the output of the NOR circuit 12 becomes an H level and applies potential to the resistor 15.

Since the potential is connected to the gate terminal of the FET 14 (also referred to as an oscillation transistor or an oscillation switch), it is conducted by being supplied with a gate driving voltage. The conduction of the FET 14 causes a current to flow to the primary winding P of the oscillation transformer 12 from the battery 1, thereby generating an induced electromotive force to the secondary winding S of the oscillation transformer 12. Accordingly, a current flows through a loop composed of the high voltage rectifying diode 17, the main capacitor 21, and the rectifying element 16.

The potential of the cathode of the rectifying element 16 is lower than that of the anode thereof by about 0.7 V due to the current flowing through the loop, which causes a current to flow from the auxiliary power source Vcc 23 through the resistors 10 and 11. In other words, the current charged in the main capacitor 21, which flows from the anode of the rectifying element 16 to the cathode thereof, partly flows from the auxiliary power source Vcc 23 through the resistors 10 and 11.

That is, when it is assumed that potential generated by the current flowing to the resistor 11 is as large as the operation potential of the rectifying element 16 when it is in operation, the gate voltage of the NOR circuit 12 connected to the resistor 11 is as large as the voltage obtained by dividing the auxiliary power source Vcc 23 and the cathode voltage by the resistors 10 and 11. That is, the resistor 11 acts as a protection device for preventing such an drawback that the input gate is made negative by the operation of the rectifying element 16 when the resistor 11 is not used.

Since the current flows from the auxiliary power source Vcc 23 to the resistor 11 through the resistor 10 as described above, the potential connected to a midpoint between the resistors 10 and 11 becomes an L level which can be maintained in this state even after the terminal b is momentarily set to the L level.

It is needless to say that the output from the terminal b to the control circuit is executed by an open collector system or an open drain system.

Continuous conduction of the FET 14 and saturation of the magnetic flux of the core of the oscillation transformer 13 cause a counter electromotive force to be generated. Thus, the main capacitor 21 has no charged current as well as no current flows from the auxiliary power source Vcc 23 to the resistors 10 and 11, which sets one input terminal of the NOR circuit 12 to an H level so that the output from the NOR circuit 12 becomes an L level.

The output from the NOR circuit 12, which becomes the L level, sets the electric charge of the gate of the FET 14 to an L level, which makes the FET 14 non-conductive momentarily. Here, a capacitor may be connected to the rectifying element 16 in parallel therewith, and further it is also possible to protect the input terminal of the NOR circuit 12 by using a Zener diode having potential somewhat higher than that of the auxiliary power source Vcc 23 as the rectifying element 16.

When the magnetic flux of the core is reduced and the counter electromotive force is reversed to a forward oscillation voltage, the rectifying element 16 receives a bias voltage again and the cathode potential thereof is reduced, so that a current flows from the auxiliary power source Vcc 23 to the resistor 11 through the resistor 10 as described above and the input terminals of the NOR circuit 12 are set to an L level, which makes the FET 14 conductive again.

Oscillation is executed by repeating the actions in the above manner, so that the voltage charged in the main capacitor 21 is increased.

While the main capacitor 21 is charged, the control circuit 201 detects the driving signal of the FET 14, which is supplied from the NOR circuit 12, through the gate of the FET 25, and the driving signal is supplied to the control circuit 201 through the drain output c, which permits the control circuit 201 to determine whether or not oscillation is executed normally (step S203).

Figure 9:
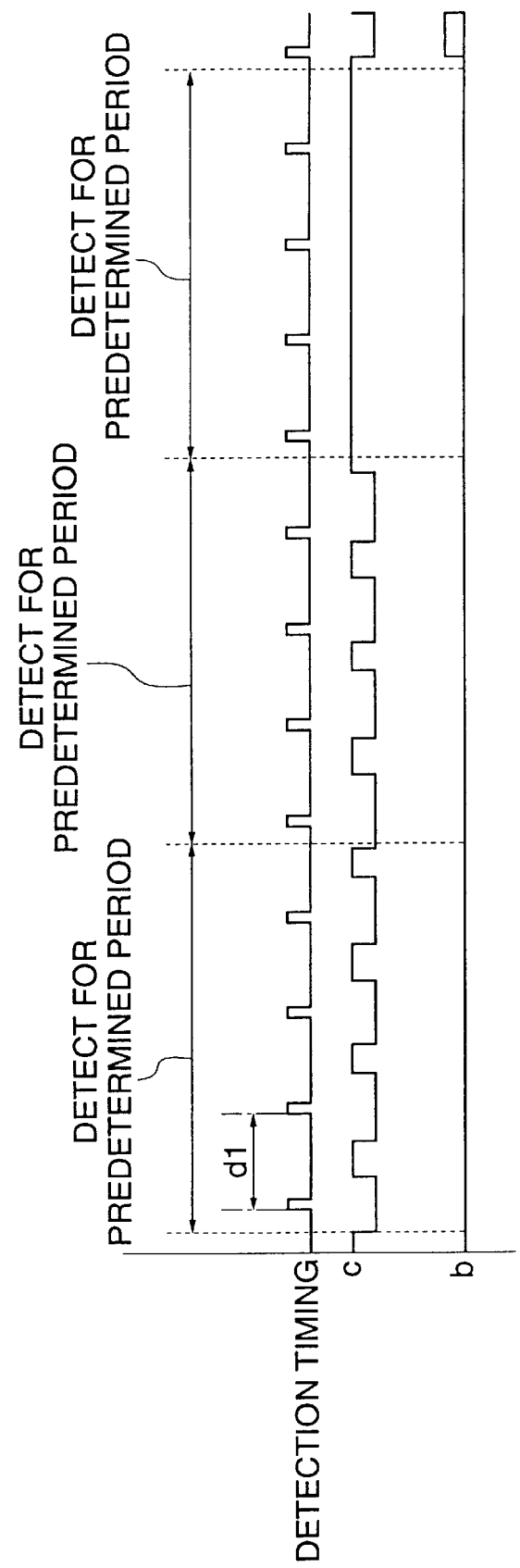
FIG. 9 is a timing chart 1 of the flash apparatus as the first embodiment of the present invention.

A method of determining the oscillation will be described with reference to the timing chart of FIG. 9. According to the determination method, the control circuit 201 repeats the operating state of a voltage boosting circuit in a unit of a predetermined period of time (for example, about 1 millisecond) which is longer than the oscillation cycle of the voltage boosting circuit, and detects the operating state at timing d1 having predetermined intervals (for example, about 10 microseconds). Then, the control circuit 201 determines that the oscillation of the voltage boosting circuit is stopped, when the control circuit 201 detects only a state which appears at a time the oscillation of the voltage boosting circuit is stopped (the control circuit 201 measures the signal inputted from the connection terminal c shown in FIG. 9 as an H level.) during the predetermined period of time. It is to be noted that the control circuit 201 is assumed to measure the potential which is pulled up therein.

Further, when the operating speed of the control circuit (CPU) 201 is so fast that the control circuit 201 can detect oscillation every several microseconds, another determination method may be utilized. This determination method will be described with reference to the timing chart of FIG. 10. According to this determination method, the control circuit 201 determines that the oscillation of the voltage boosting circuit is stopped when the control circuit 201 detects only a state which appears at a time the oscillation of the voltage boosting circuit is stopped (the control circuit 201 measures the signal inputted from the connection terminal C shown in FIG. 10 as an H level.) during a predetermined period of time (corresponding to a period T8 in FIG. 10) which is longer than the oscillation cycle of the voltage boosting circuit after the control circuit 201 finally detects a state which does not appear while the oscillation is stopped (the control circuit 201 detects the signal inputted from the connection terminal c shown in FIG. 10 as an L level.).

Next, when the control circuit 201 detects the oscillation of the voltage boosting circuit (step S203), the control circuit 201 goes to step S205 which will be described later. Further, when the control circuit 201 does not detect the oscillation of the voltage boosting circuit, the control circuit 201 outputs an oscillation re-start signal (mentioned above) set as an L level signal to the terminal b, and controls the oscillation of the voltage boosting circuit again so that the voltage boosting circuit resumes oscillation (step S204).

The voltage obtained by dividing the voltage charged in the main capacitor 21 is A/D-converted, and then the control circuit 201 receives the information of the divided voltage of the voltage charged in the main capacitor 21 from the voltage detecting circuit 18 and A/D-converts the divided voltage (step S205) and stores a result of the A/D conversion in the RAM. Next, the control circuit 201 determines whether or not the charged voltage has reached a predetermined charge completion voltage based on the divided voltage, which has been A/D-converted, of the charged voltage (step S206).

When the voltage charged in the main capacitor 21 has reached the charge completion voltage, the control circuit 201 interrupts the charging operation of the main capacitor 21 by stopping the H level signal outputted through the terminal a (step S207). Next, the control circuit 201 completes charging the main capacitor 21 by setting a charging completion flag (step S208).

Otherwise, when the voltage charged in the main capacitor 21 has not reached the charge completion voltage, the control circuit 201 determines whether or not the above-mentioned charge inhibition timer has reached a predetermined count completion value (step S209). When the charge inhibition timer has not reached the predetermined charge completion value, the control circuit 201 returns to step S203, whereas when the charge inhibition timer has reached the predetermined charge completion value, the control circuit 201 interrupts the charging operation of the main capacitor 21 by stopping the H level signal supplied through the terminal a (step S210). Next, the control circuit 201 completes charging the main capacitor 21 by setting a charging NG flag (step S211).

With this operation, the control circuit 201 completes the flash mode (step S109). The sequence of the camera will be described referring to FIG. 6 again.

The control circuit 201 determines whether or not the main capacitor 21 has been completely charged in the flash mode (step S109), by making reference to a flag (step S110).

When the charging NG flag is set, the control circuit 201 returns to step S102. Further, when the charging completion flag is set, the control circuit 201 detects SW2=ON (a state in which the switch SW2 is depressed to the second stroke position) (step S111). When the control circuit 201 does not detect SW2=ON, the process returns to step S111. Further, when the control circuit 201 detects SW2=ON, the control circuit 201 sets the lens through the lens driving means 205 based on a result of AF (refer to step S106) stored in the RAM (step S112).

Next, the control circuit 201 controls the driving of a shutter through the shutter driving means 204 and controls light emission through the flash secondary circuit 208 (step S113). Next, the control circuit 201 resets the lens to return the lens to an initial position (step S114). Next, the control circuit 201 winds up the photographic film through the film transport means 206 (step S115).

Next, the control circuit 201 determines whether or not the flash apparatus is to be preliminarily charged (step S116). When the control circuit 201 determines it is not necessary to preliminarily charge the flash apparatus, the process returns to step S102. Further, when the control circuit 201 determines that it is necessary to preliminarily charge the flash apparatus, the control circuit 201 goes to the flash mode (step S117, similar to step S108) and returns to step S102.

According to the above-mentioned arrangement, even if the oscillating operation of the oscillation circuit is temporality interrupted by the operation of the power source voltage compensating circuit, since the control circuit 201 controls the oscillation of the voltage boosting circuit again, the oscillating operation of the voltage boosting circuit can be prevented from being interrupted.

Second Embodiment

Figure 3:
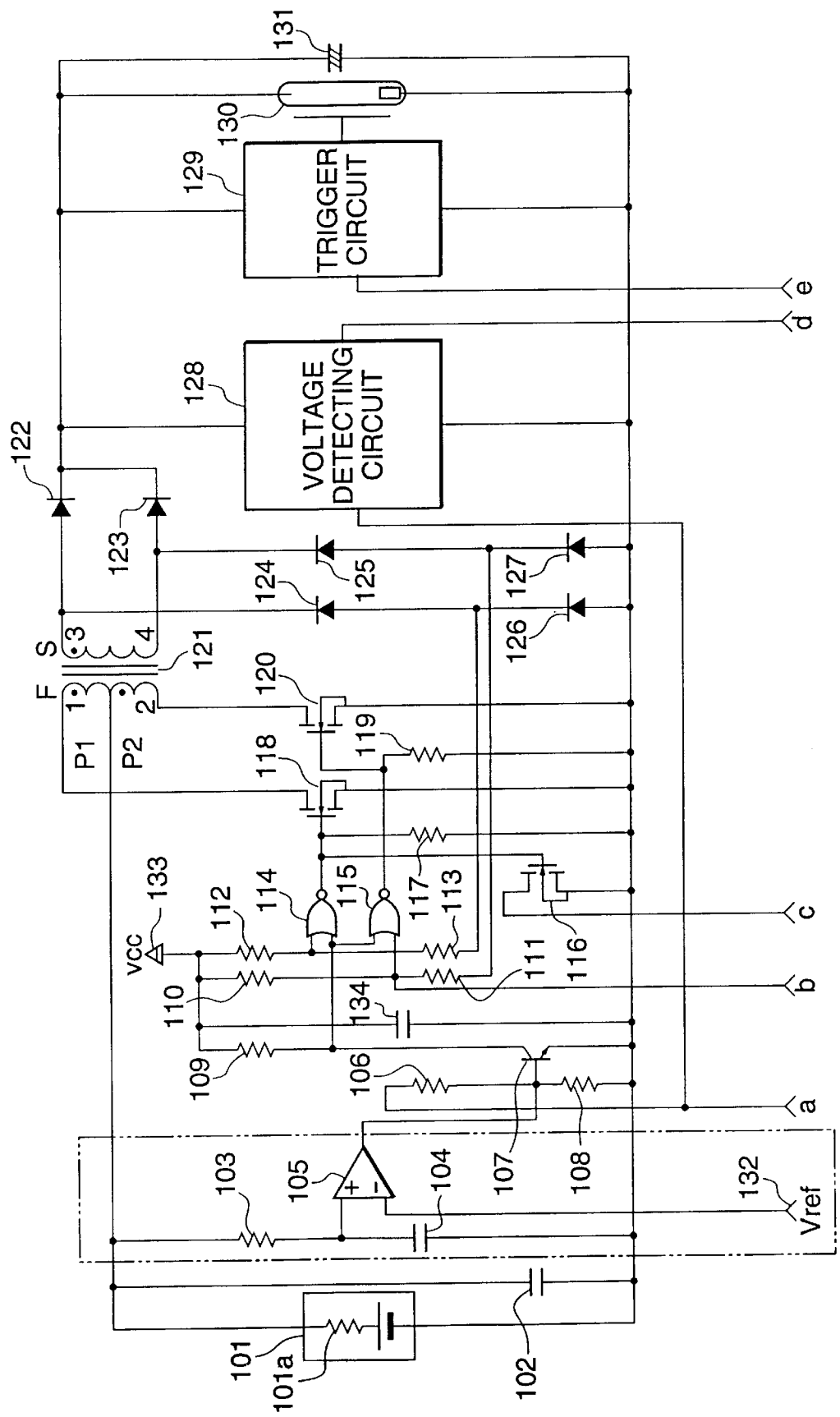
FIG. 3 is a circuit diagram showing the arrangement of a flash apparatus as a second embodiment of the present invention.

FIG. 3 is a circuit diagram showing the arrangement of a flash apparatus as a second embodiment. The second embodiment employs a second push-pull type voltage boosting circuit, while the first embodiment employs the single forward type voltage boosting circuit.

Reference numeral 101 denotes a power source battery having an internal resistor 101a, reference numeral 102 denotes a power source capacitor connected to the power source battery 101 in parallel therewith, reference numeral 103 denotes a resistor, reference numeral 104 denotes a capacitor connected to the resistor 103 in series therewith, reference numeral 105 denotes a comparison circuit having a positive terminal connected between the resistor 103 and the capacitor 104 and a negative terminal connected to a reference voltage Vref 132. A series circuit composed of the resistor 103 and the capacitor 104 is connected to the power source battery 101 in parallel therewith. The resistor 103, the capacitor 104 and the comparison circuit 105 constitute a power source voltage compensating circuit for compensating the voltage of the power source battery 101.

Reference numerals 106 and 108 denote resistors connected in series to each other, reference numeral 107 denotes a transistor connected between the resistors 106 and 108 and having a base terminal connected to the output terminal of the comparison circuit 105. The resistor 106 is connected to the transistor 107 to restrict the base current thereof. Reference numerals 110 and 112 denote NOR gate input pull-up resistors through which an auxiliary power source Vcc 133 is connected to the respective input terminals of NOR circuits 114 and 115. Reference numeral 134 denotes a power source capacitor of the auxiliary power source Vcc 133.

Reference numerals 111 and 113 denote resistors for protecting the inputs of the NOR circuits 114 and 115. Reference numeral 121 denotes an oscillation transformer, reference numerals 118 and 120 denote FETs (oscillation switches), reference numerals 117 and 119 denote pull-down resistors of the gates of the FETs 118 and 120. One end and the other end of the primary winding P of the oscillation transformer 121 are connected to the drains of the FETs 118 and 120. The positive electrode of the power source battery 101 is connected to a position between the one end and the other end of the primary winding P.

Reference numerals 124 and 125 denote reverse current prevention diodes, and reference numerals 126 and 127 denote rectifying elements. A series circuit composed of the reverse current prevention diode 124 and the rectifying element 126 is connected to an end of the secondary winding s of the oscillation transformer 121, and a series circuit composed of the reverse current prevention diode 125 and the rectifying element 127 is connected to the other end thereof. A midpoint of the former series circuit is connected to one input terminal of the NOR circuit 114 through the resistor 113, and a midpoint of the latter series circuit is connected to one input terminal of the NOR circuit 115 through the resistor 111. Reference numerals 122 and 123 denote high voltage rectifying diodes through which the respective ends of the secondary winding S are connected to a main capacitor 131.

Reference numeral 128 denotes a voltage detecting circuit connected to the main capacitor 131 in parallel therewith to detect the voltage charged in the main capacitor 131, reference numeral 129 denotes a trigger circuit for applying a high voltage trigger pulse to a discharge tube 130 connected to the main capacitor 131 in parallel therewith in response to a light emission signal from a control circuit.

Reference numerals 118 and 120 denote the FETs as described above having gates connected to the outputs of the NOR circuits 114 and 115, sources connected to the ground, and drains connected to the control circuit of a camera. Reference symbols a to e denote control terminals connecting between the control circuit and the flash apparatus, respectively. As will be described later, the control circuit controls the flash apparatus through the connecting terminals a to e.

Since the sequence of the camera is the same as that shown in the flowcharts of FIGS. 6 and 7, its explanation is omitted here, and only the operation of the flash apparatus and step 203 shown in FIG. 7 (a method of detecting whether or not oscillation is executed normally) will be explained here.

When it is necessary to charge the flash apparatus, the control circuit applies an H level signal thereto through the terminal a. With this operation, since a base current flows to the transistor 107 through the resistor 106, the transistor 107 is made conductive and one input terminals of the NOR circuits 114 and 115 are set to an L level. Further, the control circuit supplies an L level signal (for example, a pulse signal of several tens of microseconds) to the terminal b approximately at the same time.

With this operation, both the inputs of the NOR circuit 115 are set to an L level, whereby the output thereof becomes an H level so as to apply gate potential to the FET 120. Thus, the FET 120 is made conductive. The conduction of the FET 120 causes a current to flow from the battery 101 to the primary winding P2 of the oscillation transformer 121. This current causes a current to flow to the secondary winding S of the oscillation transformer 121 through a loop composed of the high voltage rectifying diode 122, the main capacitor 131, and the rectifying elements 127 and 125.

With this operation, the cathode potential of the rectifying element 127 is reduced by an operating voltage and becomes as large as the current outputted from the oscillation transformer 121. The current charged in the main capacitor 131 partly flows from the auxiliary power source Vcc 133 through the resistors 110 and 111. When it is assumed that the auxiliary power source Vcc 133 has a voltage of 5 V and the resistor 110 has a resistance of 22 KΩ, the resistor 111 has a resistance of about 3.3 KΩ, and the current, which flows through the auxiliary power source Vcc 133, is about 230 μA. This current permits an input connected to a midpoint between the resistors 110 and 111 to be maintained in an L level.

As described above, the period of time of the L level signal applied to the terminal b to start oscillation is a period of time during which the secondary output of the oscillation transformer 121 is stably generated, and about several tens of microseconds are sufficient for this purpose and the L level can be maintained by the secondary output.

When the FET 120 is continuously made conductive and the magnetic flux of the core of the oscillation transformer 121 is saturated, the charged current is exhausted and a counter electromotive force is generated. When the charged current is exhausted, the forward bias current of the rectifying element 127 disappears and the input terminals of the NOR circuit 115 are set to an H level, which sets the output from the NOR circuit 115 to an L level. With this operation, the FET 120 is made non-conductive momentarily.

The counter electromotive force flows through a loop composed of the high voltage rectifying diode 123, the main capacitor 131, the rectifying element 126, and the reverse current prevention diode 124, which reduces the anode potential of the rectifying element 126 by the operating voltage. Further, since the charged voltage partially flows from the auxiliary power source Vcc 133 through the resistors 112 and 113, one input terminal of the NOR circuit 114 becomes an L level. In contrast, since the other input terminal of the NOR circuit 114 is connected to the collector of the transistor 107, which has been set to an L level, an H level is outputted from the NOR circuit 114. Accordingly, the FET 118 is made conductive by the gate potential applied to the gate thereof.

The FET 118 is made conductive and the magnetic flux of the core of the oscillation transformer 121 is saturated, which causes the FETs 118 and 120 to alternately repeat conduction and non-conduction, so that an oscillating operation is executed. With this operation, the voltage charged in the main capacitor 131 is increased.

Next, an oscillating state detecting method (step S203 in FIG. 7) in the second embodiment will be explained.

Figure 11:
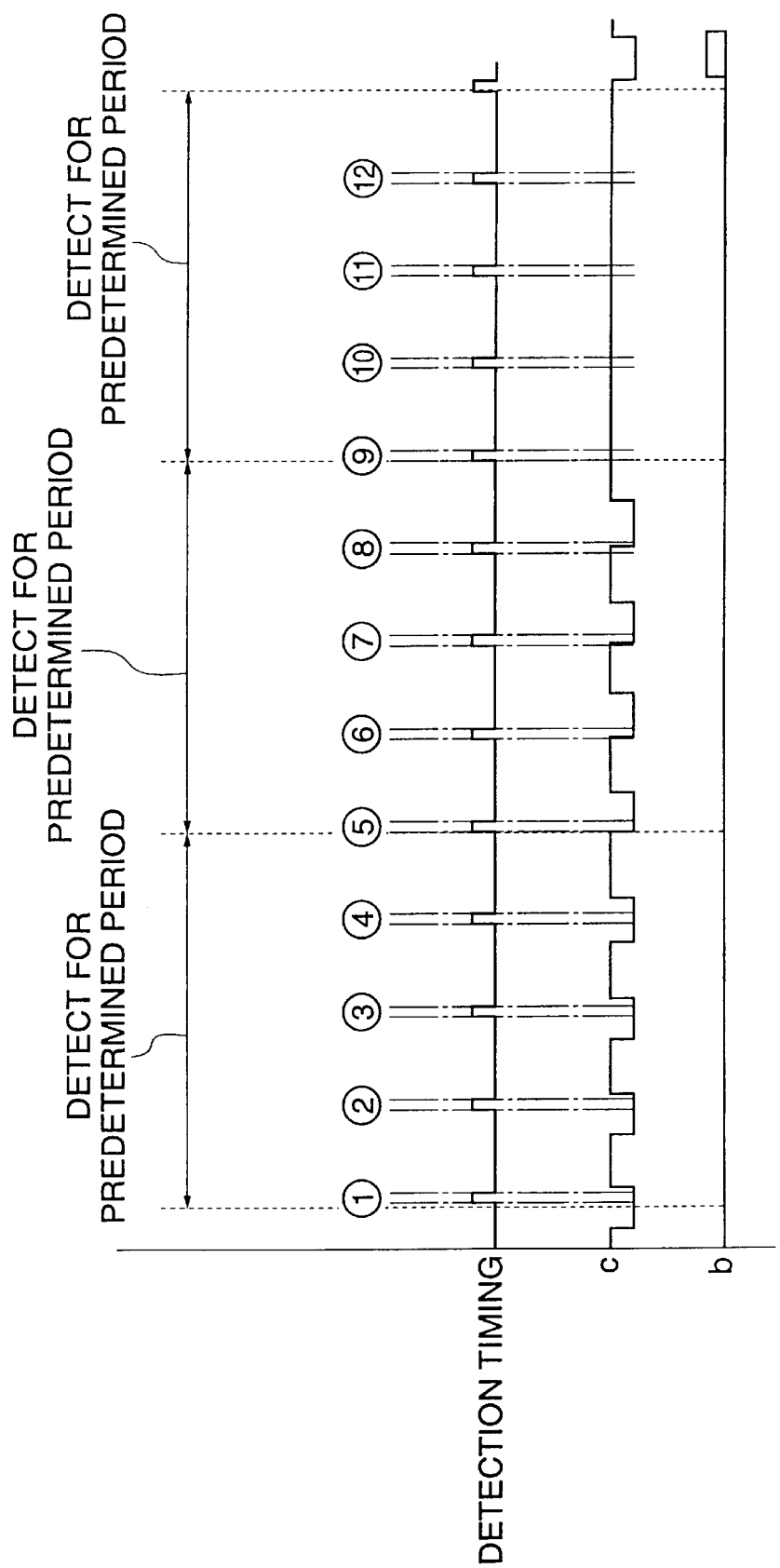
FIG. 11 is a timing chart 1 of the flash apparatus as the second embodiment of the present invention.

The duty of the oscillation signal of the single forward type voltage boosting circuit in the first embodiment can be easily detected because its turning-on time is long with an ON/OFF ratio set to 7:3. In contrast, in the push-pull voltage boosting circuit in the second embodiment, the ON/OFF ratio is set to 1:1 or a ratio of ON is 50% or less. As a result, when the timing of detection is in agreement with the timing of a driving signal c outputted from the terminal c even once as shown, for example, at timing (1) to (4) and (5) to (8) of the timing chart in FIG. 11, oscillation can be detected as normal oscillation. Further, since oscillation is interrupted from timing (8) to (12), an oscillation start signal b is outputted based on a result of detection.

Figure 16:
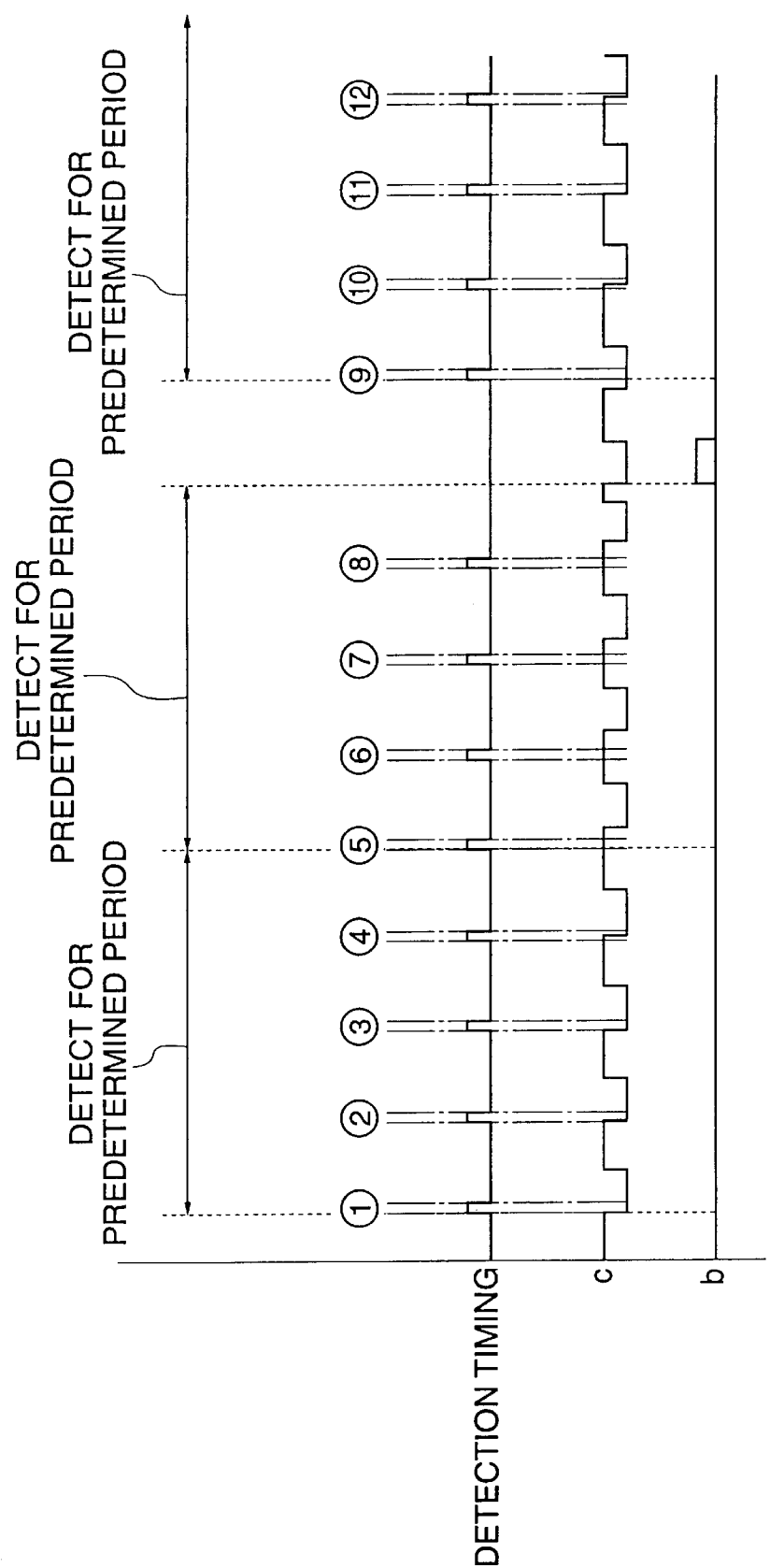
FIG. 16 is a timing chart 3 of the flash apparatus as the second embodiment of the present invention.

However, as shown in the timing chart of FIG. 16, when the control circuit (CPU) has a low operating frequency and the timing of sampling is synchronized with an oscillating frequency, oscillation is normally detected at timing (1) to (4), whereas, at timing (5) to (8), it is erroneously detected that oscillation is interrupted regardless of that it is normally executed, and the oscillation start signal b is outputted. Accordingly, the oscillation start signal b is outputted regardless of that oscillation is executed normally. As a result, both the FETs 118 and 120 are placed in a conducting state (the power source is short-circuited), which requires avoiding the erroneous detection.

Figure 19:
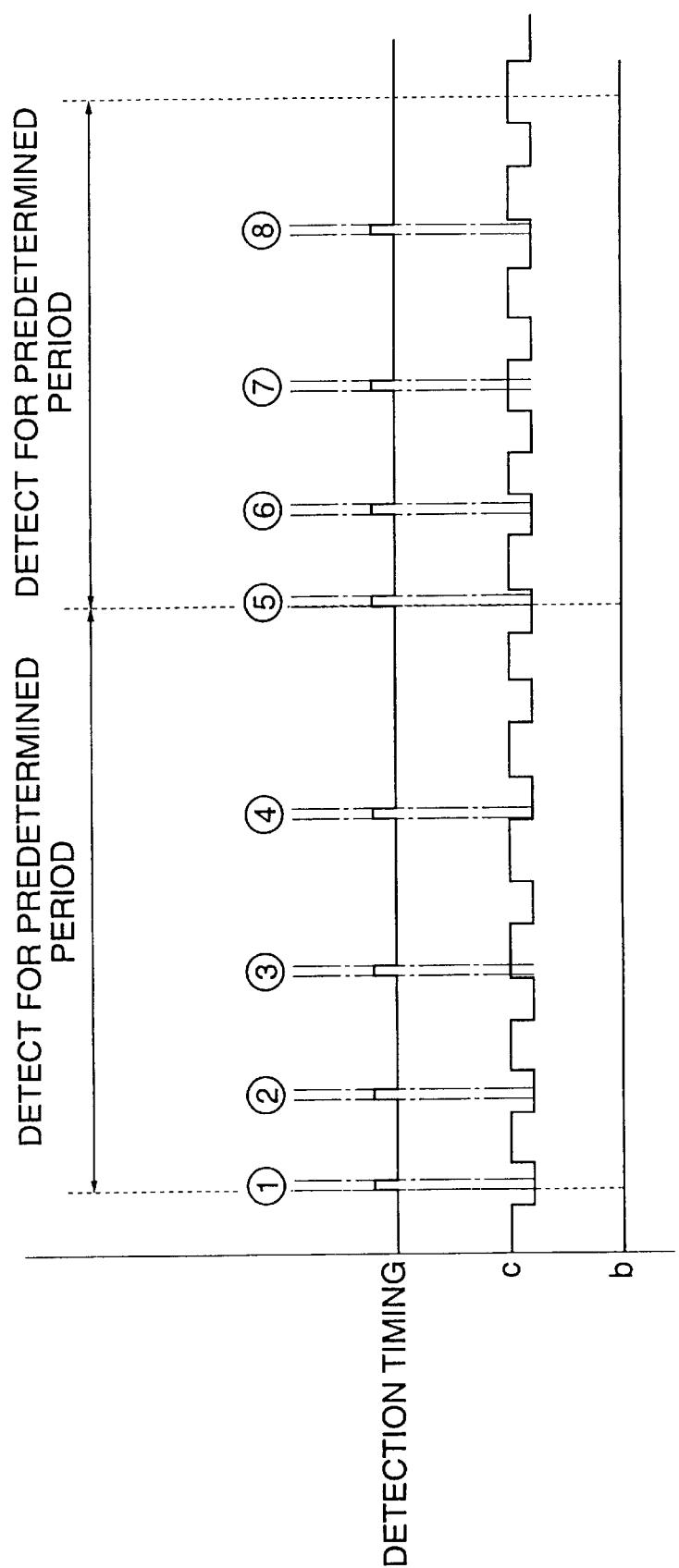
FIG. 19 is a timing chart 6 of the flash apparatus as the second embodiment of the present invention.

Here, as shown in FIG. 19, a state of the voltage boosting circuit is detected by changing the timing of detection such that the timing at (2) to (3) is set to 1.3 times that at (1) to (2), and the timing at (3) to (4) is set to 1.3 times that at (2) to (3) (here the state of the voltage boosting circuit is detected at the timing which is set to intervals of geometric progression). Accordingly, an L level is detected in a predetermined time detection 1 at timing (1), (2) and (4), and further an L level is detected in a predetermined time detection 2 at timing (5), (6) and (8). Therefore, oscillation is not erroneously detected.

The shift of timing of detection as described above can change a detecting cycle when it is the same or near to an oscillation cycle, which allows the control circuit 210 to correctly detect oscillation without erroneous detection. Further, it is needless to say that the present invention is not limited to set the timing of detection to 1.3 times as described above and may detect oscillation at any timing as long as it is out of synchronization.

Figure 12:
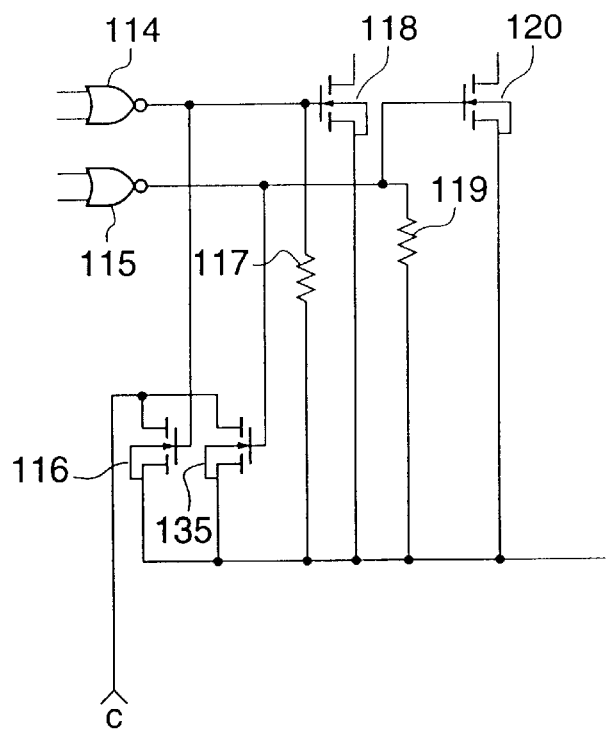
FIG. 12 is a partial circuit diagram 1 showing the modified arrangement of the flash apparatus as the second embodiment of the present invention.
Figure 17:
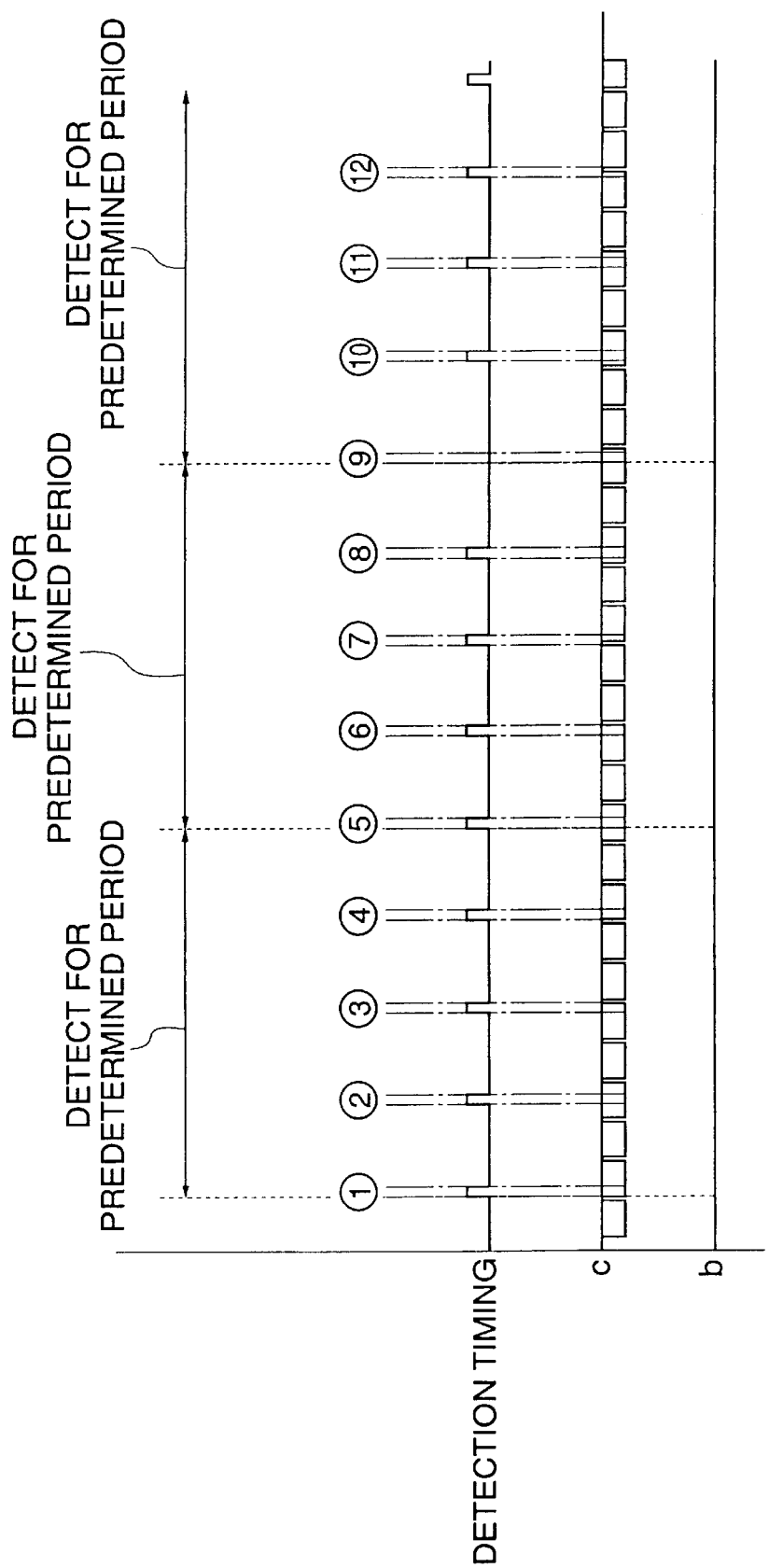
FIG. 17 is a timing chart 4 of the flash apparatus as the second embodiment of the present invention.

Further, as a method of avoiding this kind of erroneous detection, the FETs 116 and 135 may be added at positions where oscillating operations are executed symmetrically as shown in the partial circuit diagram of FIG. 12 with the drains thereof connected to the terminal c so that respective oscillation signals can be detected. With this arrangement, the ratio of an L level, which indicates oscillation of an oscillation signal, is increased as shown in the timing chart of FIG. 17, which prevents the occurrence of erroneous detection for detecting the interruption of oscillation.

Figure 13:
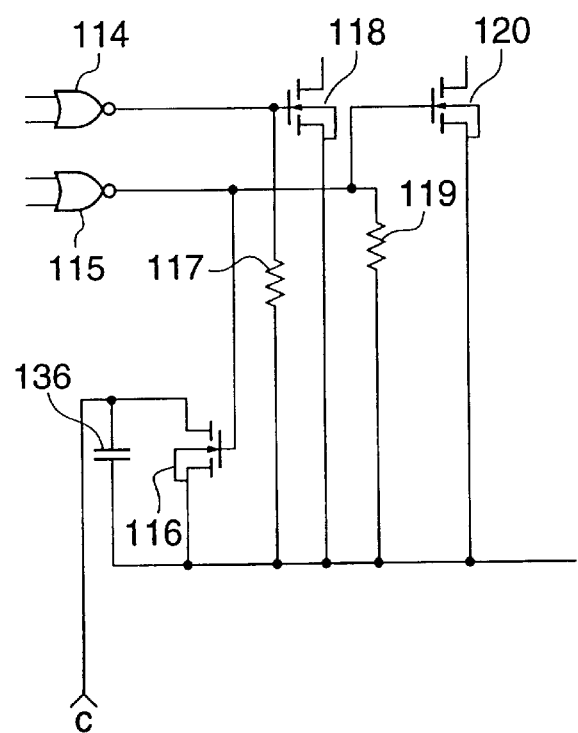
FIG. 13 is a partial circuit diagram 2 showing the modified arrangement of the flash apparatus as the second embodiment of the present invention.
Figure 18:
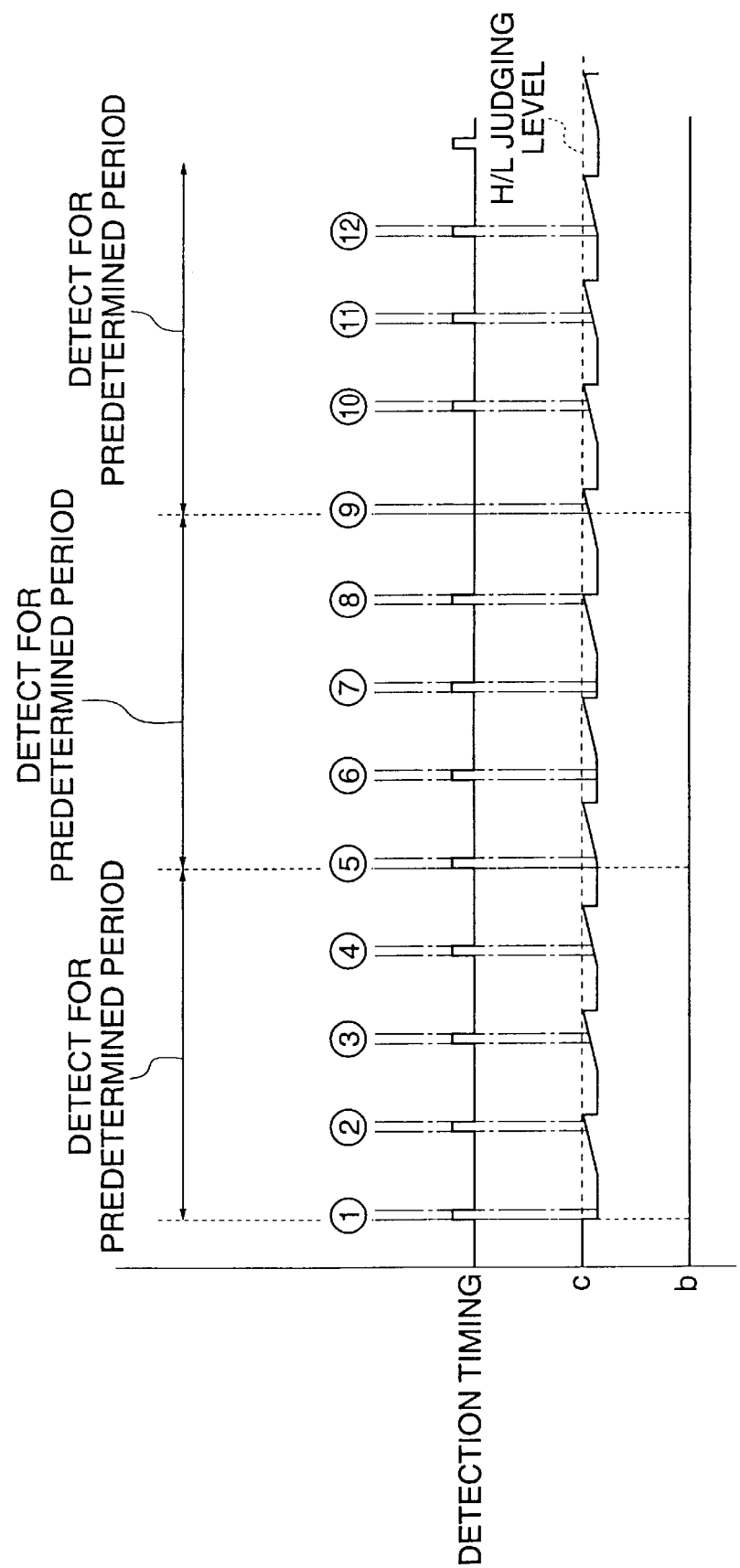
FIG. 18 is a timing chart 5 of the flash apparatus as the second embodiment of the present invention.

Further, as shown in the partial circuit diagram of FIG. 13, the occurrence of erroneous detection can be prevented by delaying a change of a voltage as shown in FIG. 18 to prevent the control circuit 201 from detecting an H level in such a manner that a capacitor 136 is added to the drain of the FET 116 to provide a time constant with the resistance component of the input terminal c so that an increase of potential at the terminal c is delayed.

Third Embodiment

Figure 4:
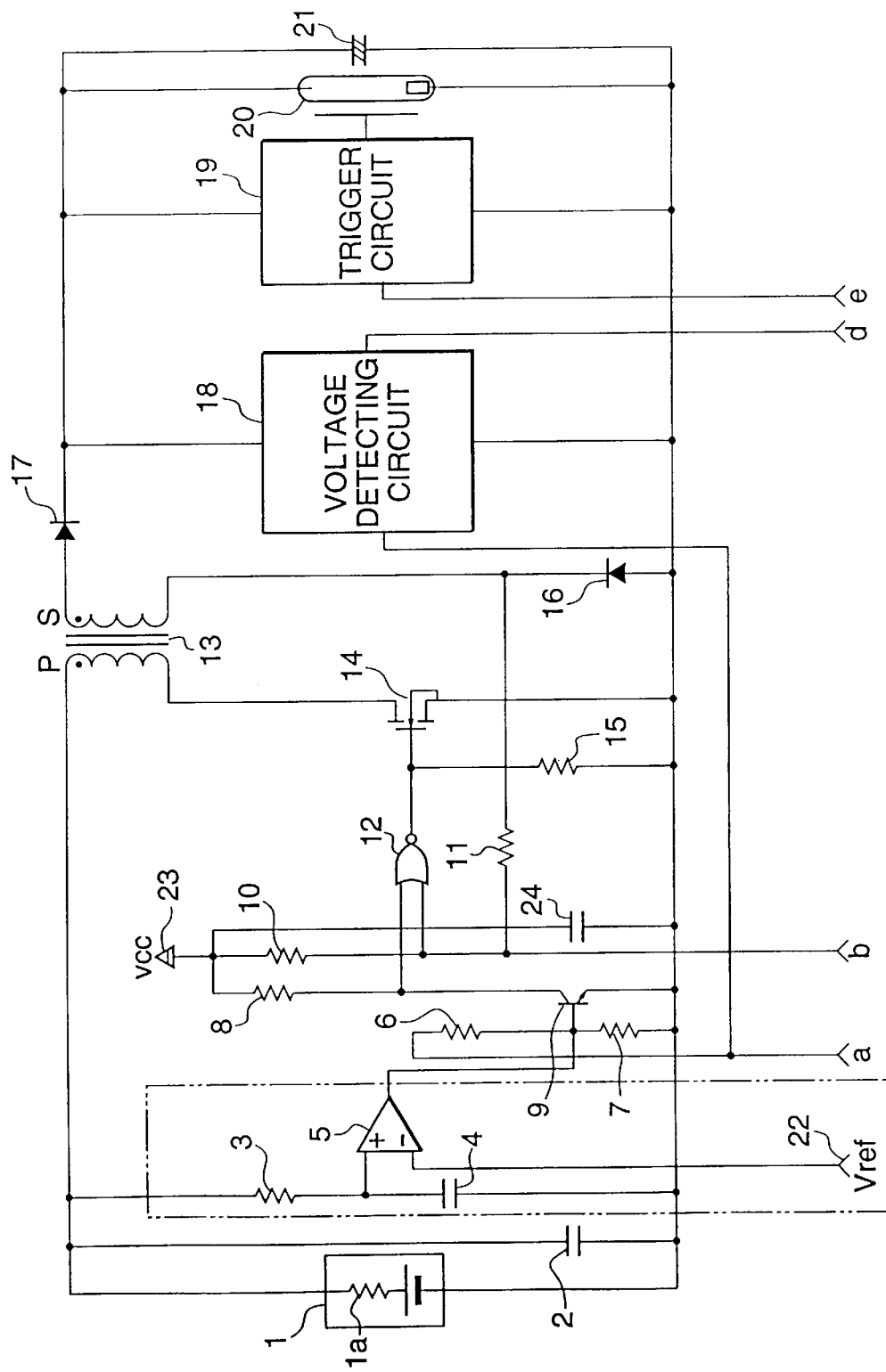
FIG. 4 is a circuit diagram showing the arrangement of a conventional flash apparatus.
Figure 5:
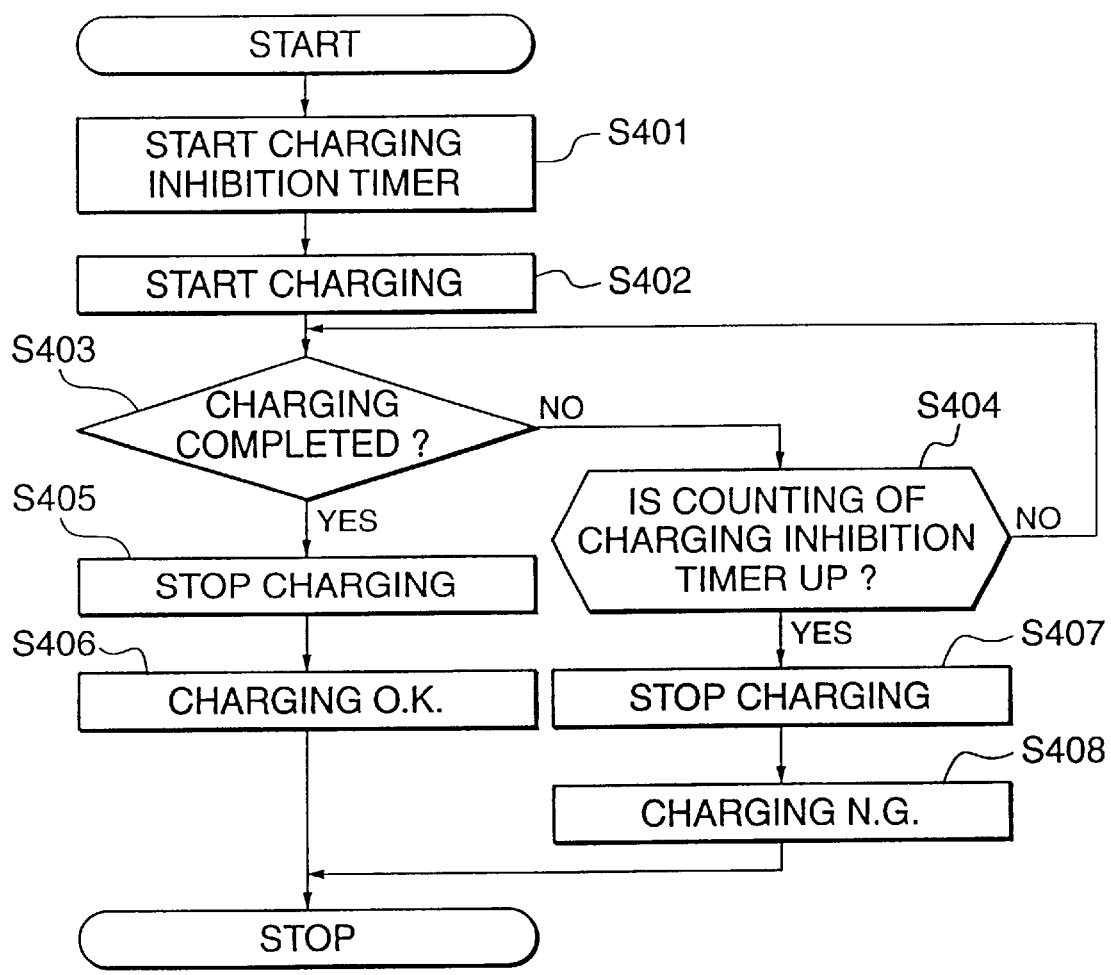
FIG. 5 is a flowchart showing a flow of a flash mode of the conventional flash apparatus.

Next, a circuit diagram in a third embodiment of the invention is the circuit diagram showing the arrangement of the conventional flash apparatus shown in FIG. 4.

Further, the sequence of a camera is similar to that of the first embodiment.

Figure 20:
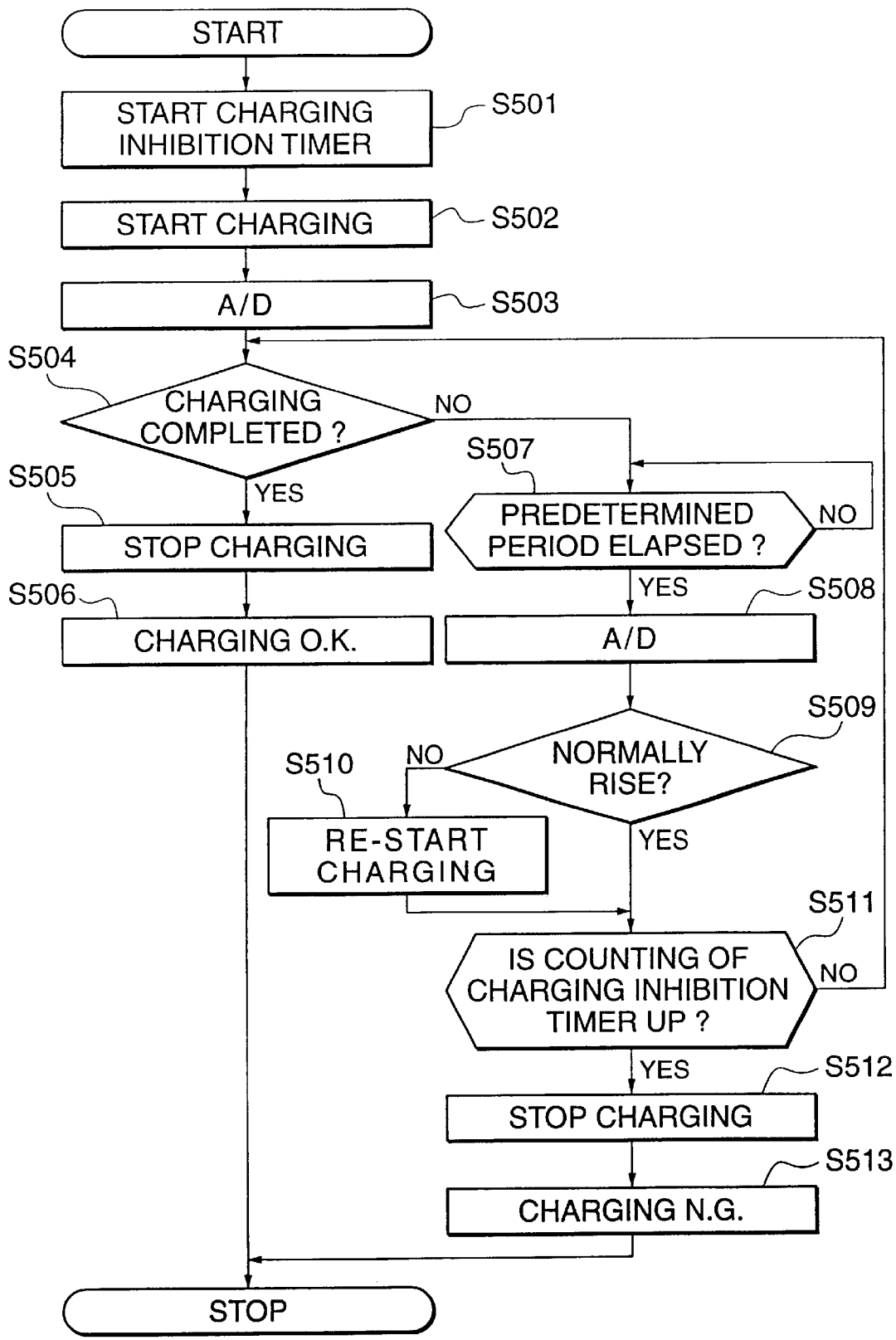
FIG. 20 is a flowchart showing a flow of a flash mode as a third embodiment of the present invention.

The operation in a flash mode (steps S109 and S117) will be described here with reference to FIG. 20. FIG. 20 is a flowchart showing the flow of the operation in the flash mode.

First, a control circuit 201 operates a charge inhibition timer (ordinarily 10 to 15 seconds) for interrupting charge of a main capacitor 21 (step S501). Next, the control circuit 201 applies an H level signal through a terminal a to start oscillation and further applies an L level signal (pulse signal of about several tens of microseconds) to a terminal b (step S502).

Since a charging operation is executed as described at step S202 in the first embodiment, the description thereof is omitted here.

Next, the control circuit 201 receives the information of a divided voltage of the voltage charged in the main capacitor 21 from a voltage detecting circuit 18, A/D-converts the divided voltage (step S503), and stores a result of the A/D conversion in a RAM.

Next, the control circuit 201 determines whether or not the charged voltage has reached a predetermined charging completion voltage based on the divided voltage, which has been A/D-converted, of the charged voltage (step S504).

When the voltage charged in the main capacitor 21 has reached the charging completion voltage, the control circuit 201 interrupts the charging operation of the main capacitor 21 by stopping the H level signal outputted through the terminal a (step S505).

Next, the control circuit 201 completes the charging by setting a charging completion flag (step S506).

Otherwise, when the voltage charged in the main capacitor 21 has not reached the charging completion voltage, the control circuit 201 waits for a predetermined period of time to elapse from the A/D conversion (step S503) or from the A/D conversion (step S508). The predetermined period of time is a time during which the voltage charged in the main capacitor 21 can be increased. The predetermined period of time may be set to have constant intervals or may be set shorter in the former period of charge and longer in the latter period thereof in accordance with a charged voltage.

Next, the control circuit 201 receives the information of the divided voltage of the voltage charged in the main capacitor 21 from the voltage detecting circuit 18, A/D-converts the divided voltage, and stores a result of the A/D conversion in the RAM.

Next, the control circuit 201 compares whether or not the charged voltage is increased as compared with the voltages of the main capacitor 21 which were subjected to the A/D conversion at step S503 or S508 and detected last time.

When it is confirmed that the voltage charged in the main capacitor 21 has been increased, the control circuit 201 determines whether or not the above-mentioned charge inhibition timer has reached a predetermined completion count value (step S511).

Further, when it is not confirmed that the voltage charged in the main capacitor 21 has been increased, it can be confirmed that a voltage boosting circuit has interrupted oscillation. Thus, the control circuit 210 outputs an oscillation re-start signal (above-mentioned) which is an L level signal to the terminal b and controls the oscillation of the voltage boosting circuit again (step S510). Then, the control circuit 201 determines whether or not the above-mentioned charge inhibition timer has reached the predetermined completion count value (step S511). When the charge inhibition timer has not reached the predetermined completion count value, the control circuit 201 returns to step S504 and repeats the above-mentioned charge sequence.

Further, when the charge inhibition timer has reached the predetermined completion count voltage, the control circuit 201 interrupts the charging operation of the main capacitor 21 by stopping the H level signal outputted through the terminal a (step S512). Next, the control circuit 201 completes the charging by setting a charging NG flag (step S513).

Fourth Embodiment

A circuit diagram in a fourth embodiment of the invention is the same as that in the first or second embodiment (FIGS. 1 and 3).

Figure 8:
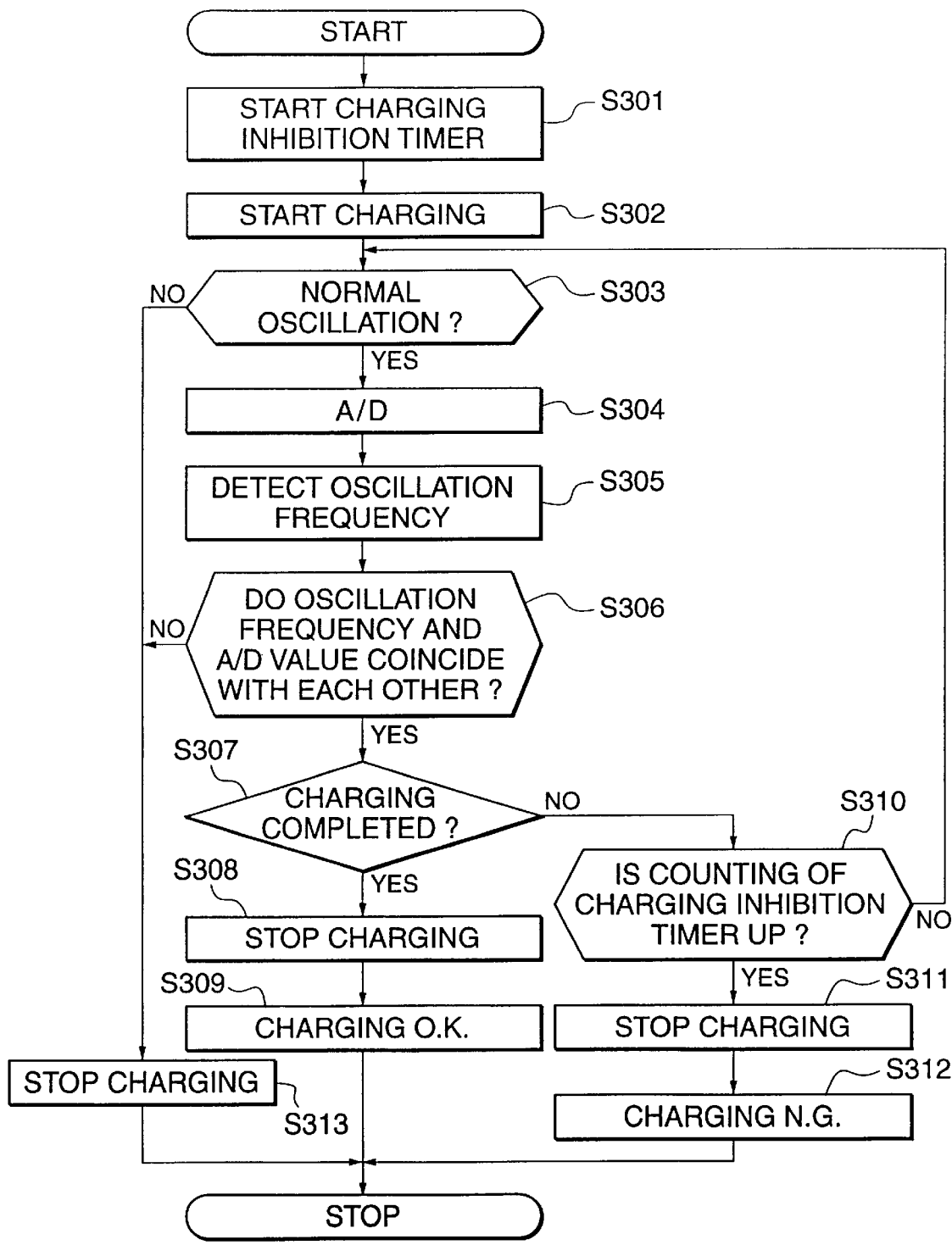
FIG. 8 is a flowchart showing a flow of a flash mode as a fourth embodiment of the present invention.

Thus, only a method of confirming whether or not oscillation is executed normally in a flash mode of the fourth embodiment will be described with reference to the flowchart of FIG. 8 (steps S303 to 307 and S313).

Figure 10:
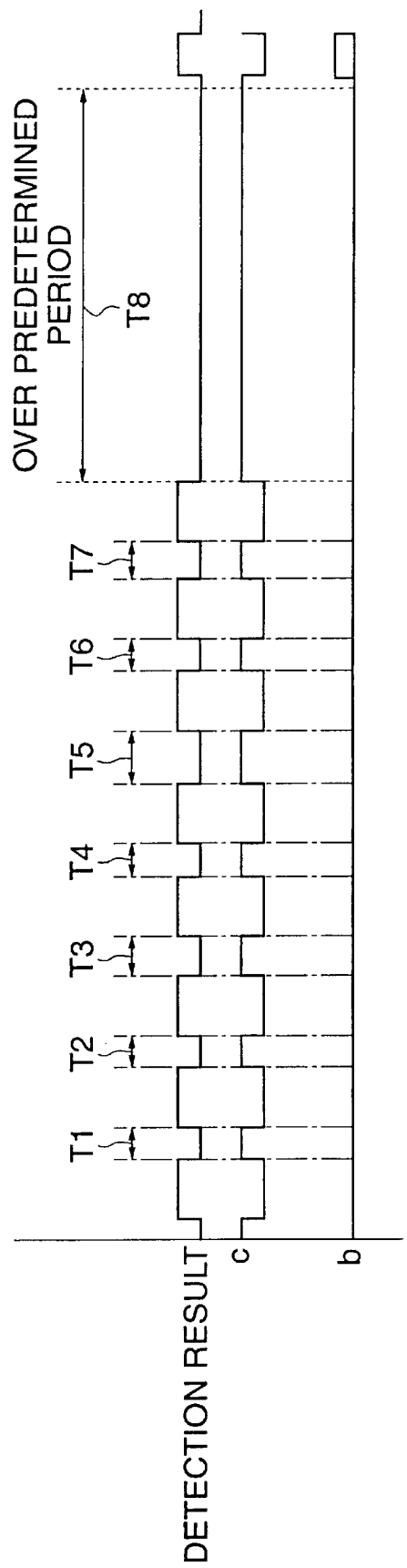
FIG. 10 is a timing chart 2 of the flash apparatus as the first embodiment of the present invention.

The determination method shown in FIG. 10 in the first embodiment is applied here. That is, a control circuit 201 detects a state of a voltage boosting circuit (step S303), and determines that the oscillation signal from the voltage boosting circuit is abnormal when the control circuit 201 detects only a state which does not appear while oscillation is interrupted (the state is measured assuming that the signal inputted from the connection terminal c shown in FIG. 10 is an L level signal) during a predetermined period of time (corresponds to a period T8 in FIG. 10) which is longer than the oscillation time of the voltage boosting circuit after the control circuit 201 finally detects a state which appears while the oscillation of the voltage boosting circuit is interrupted (the state is measured assuming that the signal inputted from the connection terminal c shown in FIG. 10 is an H level signal).

It is contemplated that a state, in which the L level signal is continuously inputted to the connection terminal c, indicates that the secondary side of a capacitor 21 is short-circuited similarly to the short-circuit of a battery. As a result, there is a possibility of the occurrence of phenomena such as heating of a battery 1 and heating, smoking, and the like of an oscillation transistor 14. To cope with this problem, when an abnormal state is detected in an oscillation signal, the control circuit 201 changes the level of the signal outputted from a connection terminal a from an H level to an L level, thereby stopping charging by interrupting the oscillation of the voltage boosting circuit (step S313).

With this operation, even if a large current is discharged by, for example, the short-circuit of a main capacitor 21, the control circuit 201 determines an abnormal state at an early time and can stop the operation of the voltage boosting circuit.

Otherwise, when it is detected that an oscillation signal is in a normal state, the control circuit 201 receives the information of a divided voltage of the voltage charged in the main capacitor 21 from a voltage detecting circuit 18, A/D-converts the divided voltage and stores a result of the A/D conversion in a RAM, similarly to step S205 (FIG. 7).

Figure 14:
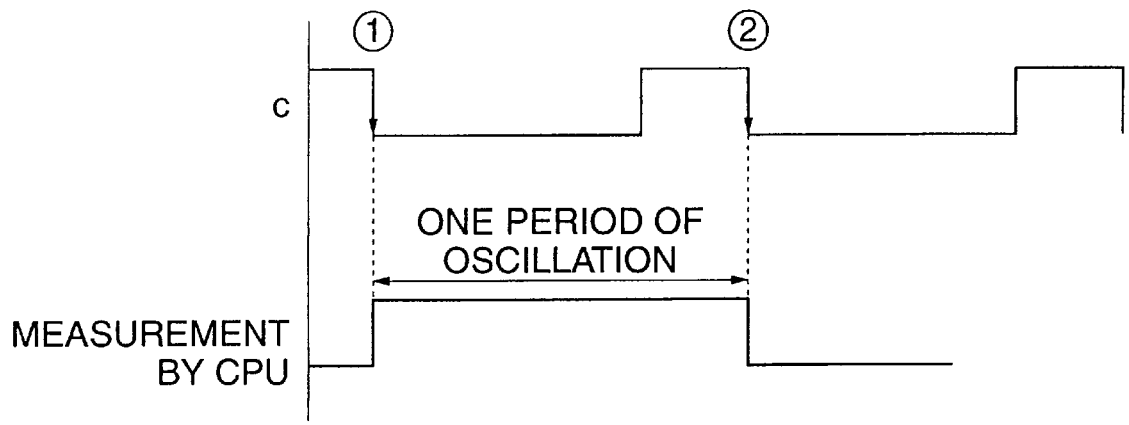
FIG. 14 is a timing chart of a flash apparatus as the fourth embodiment of the present invention.

Next, the control circuit 201 measures the time from (1) to (2) shown in the timing chart of FIG. 14 (the one cycle of the oscillation signal) and stores an oscillation frequency obtained therefrom in the RAM (step S305).

Next, the control circuit 210 compares the oscillation frequency stored in the RAM (refer to step S305) with a reference frequency (to be described later) corresponding to the voltage charged in the main capacitor 21 based on the divided voltage of the charged voltage stored in the RAM in the same way (refer to step S304) and determines whether or not a difference between both the frequencies is within a predetermined range, for example, within ±10% of the reference frequency (step S306).

Figure 15:
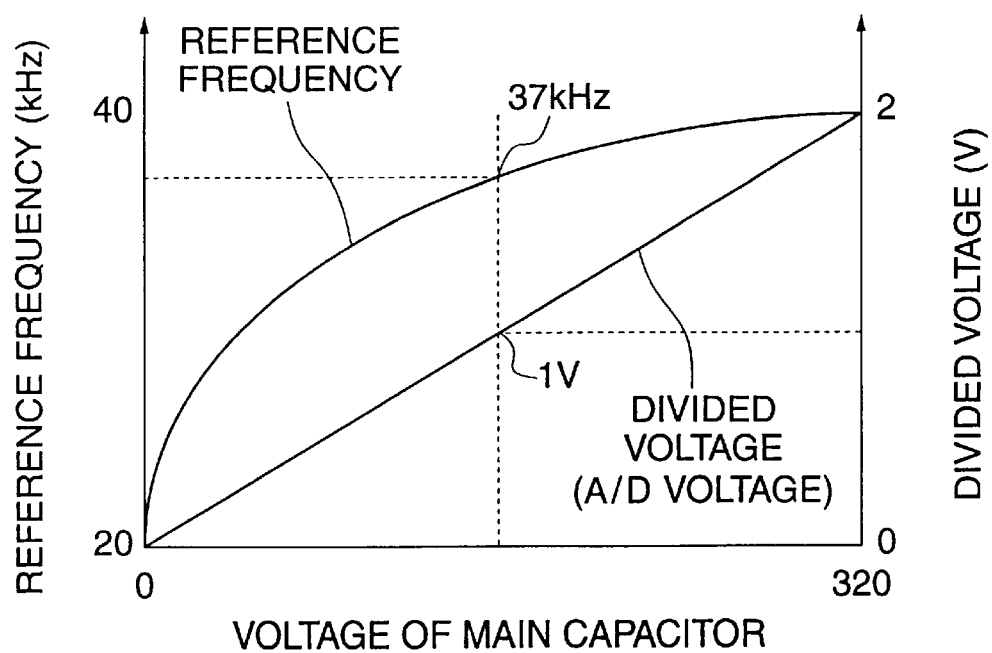
FIG. 15 is a graph showing a corresponding relationship or the like between a reference frequency and a divided voltage.

An example of a process for determining the agreement will be explained with reference to the graph of FIG. 15, which shows a correspondence relationship and the like between the reference frequency and the divided voltage. When it is assumed that the voltage charged in the main capacitor 21 is 160 V (divided voltage: 1 V), the reference frequency corresponding to the charged voltage is 37 kHz. At this time, when the oscillation frequency also is about 37 kHz, the reference frequency is in agreement with the oscillation frequency. At this time, the control circuit 201 goes to step S307 (similar to step S206 of FIG. 7).

In contrast, when, for example, a terminal d for detecting a voltage is broken, the divided voltage of the voltage charged in the main capacitor 21 is made to 0 V, from which the control circuit 201 determines that the oscillation frequency is 0 V. Thus, since the reference frequency (37 kHZ) is not in agreement with or in approximate agreement with the oscillation frequency (0 V), the control circuit 201 determines that the oscillation of the voltage boosting circuit is abnormal and goes to the above-mentioned step for stopping charging (step S313).

With this operation, even if the main capacitor 21 is excessively charged because, for example, the terminal d for detecting a voltage is broken or electrically connected to another signal by some factor, the control circuit 210 can determine that the main capacitor 21 is in an abnormal state at an early time and can interrupt the operation of the voltage boosting circuit.

Fifth Embodiment

FIGS. 21 to 24 show a fifth embodiment of the present invention.

Figure 21:
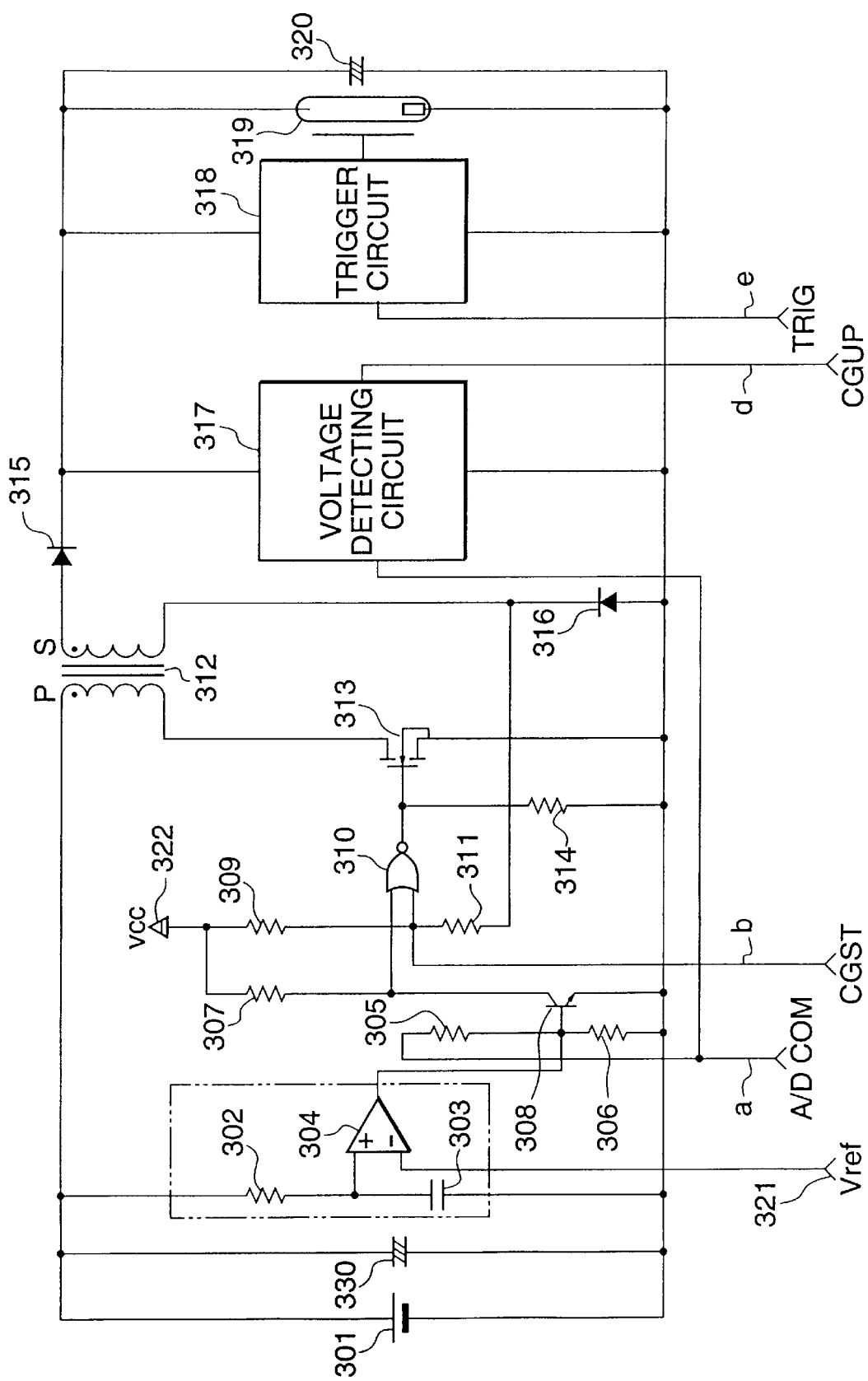
FIG. 21 is a circuit diagram of a flash apparatus as a fifth embodiment of the present invention.
Figure 26:
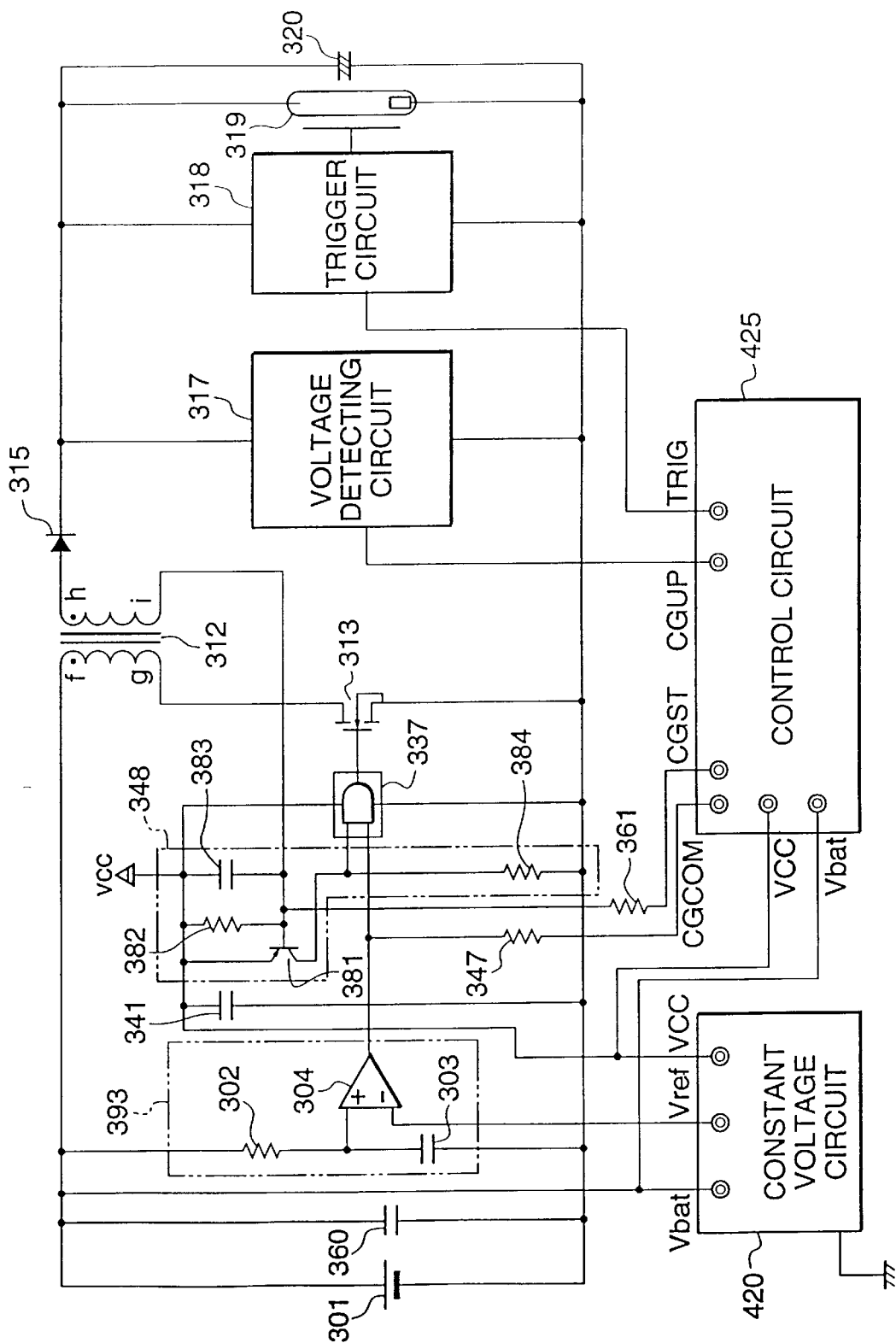
FIG. 26 is a circuit diagram of the conventional flash apparatus.

FIG. 21 shows a circuit diagram of a flash apparatus. In FIG. 21, since a constant voltage circuit and a control circuit are the same as those shown in FIG. 26, an illustration thereof is omitted except that only terminal names are shown.

In FIG. 21, reference numeral 301 denotes a battery acting as a power source, and reference numeral 330 denotes a power source capacitor connected to the battery 301 in parallel therewith. Reference numeral 302 denotes a resistor, reference numeral 303 denotes a capacitor, and reference numeral 304 denotes a comparison circuit 304. A series circuit composed of the resistor 302 and the capacitor 303 is connected to the battery 301 in parallel therewith, and the voltage at a middle point between the resistor 302 and the capacitor 303 is connected to the illustrated (+) input of the comparison circuit 304. The comparison circuit 304 is a comparator having an open collector.

Reference numerals 305 and 306 denote resistors, respectively, and reference numeral 308 denotes a transistor. The resistor 306 is connected between the base and emitter of the transistor 308, and the resistor 305 is connected to the base of the transistor 308 to restrict a base current. Reference numerals 307 and 309 denote resistors, and reference numeral 310 denotes a NOR circuit. The resistors 307 and 309 are connected to the NOR circuit 310 as the pull-up resistors of NOR gate inputs.

Reference numeral 311 denotes a resistor which is connected to the NOR circuit 310 as a protective resistor for protecting the input thereof. Reference numeral 312 denotes an oscillation transformer, reference numeral 313 denotes an FET, and reference numeral 314 denotes a resistor acting as a gate pull-down resistor of the FET 313.

One end of the primary winding P of the oscillation transformer 312 is connected to the positive electrode of the battery 301, the other end thereof is connected to the drain of the FET 313, and the source of the FET 313 is connected to the negative electrode of the battery 301.

Reference numeral 315 denotes a high voltage rectifying diode, reference numeral 316 denotes a rectifying element, reference numeral 317 denotes a voltage detecting circuit, reference numeral 318 denotes a trigger circuit, reference numeral 319 denotes a discharge tube, and reference numeral 320 denotes a main capacitor. A series circuit composed of the high voltage rectifying diode 315, the main capacitor 320, and the rectifying element 316 is connected to the secondary winding S of the oscillation transformer 312.

The voltage detecting circuit 317 is connected to the main capacitor 320 in parallel therewith to detect the voltage thereof. The trigger circuit 318 is connected to the main capacitor 320 in parallel therewith and arranged to apply a high voltage trigger pulse to the discharge tube 319 connected to the main capacitor 320 in parallel therewith in response to an light emission signal from the control circuit of the camera shown in FIG. 22, which will be described later. Reference numerals 321 and 322 denote power sources from the camera control circuit, and these power sources are shown as a reference voltage Vref and an auxiliary power source Vcc.

Figure 22:
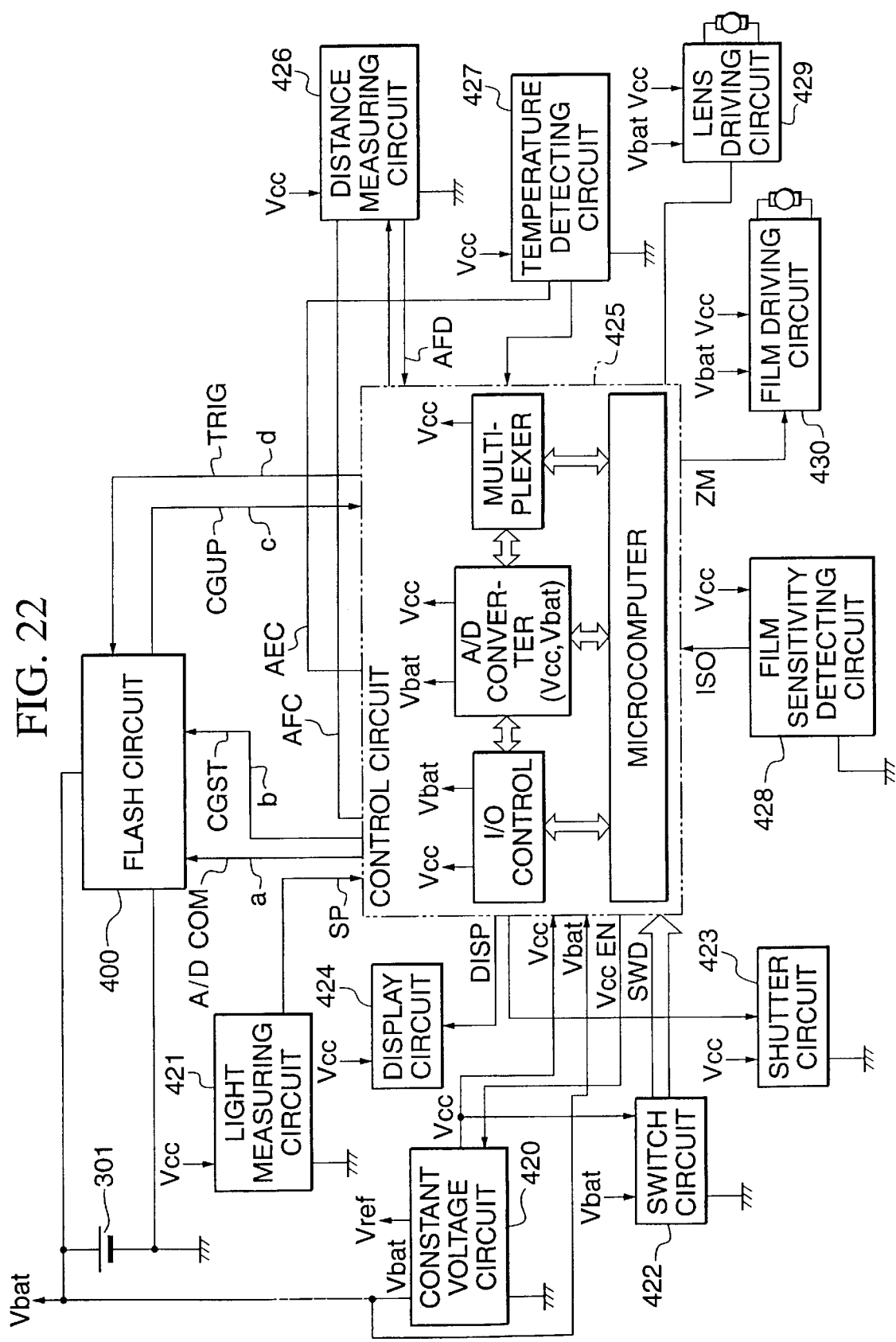
FIG. 22 is an electric circuit diagram of the flash apparatus shown in FIG. 21 and a camera connected thereto.

FIG. 22 shows the control circuit of the camera, which includes a microcomputer, for operating the flash apparatus 100.

In FIG. 22, reference numeral 420 denotes a constant voltage circuit shown as a block which is controlled by a control circuit 425 through a VccEN terminal and supplies the reference voltage Vref and the electric powers used in the respective circuit blocks.

Reference numeral 421 denotes a light measuring circuit shown as a block, and reference numeral 422 denotes a switch circuit shown as a block. The switch circuit 422 is operated by the power source Vcc and transmits the changes of respective switches to the control circuit 425. Reference numeral 423 denotes a shutter circuit 423 shown as a block, and reference numeral 424 denotes a display circuit 424 shown as a block which displays necessary information on a display unit, for example, an LCD, or the like.

Reference numeral 426 denotes a distance measuring circuit shown as a block, reference numeral 427 denotes a temperature measuring circuit shown as a block, and reference numeral 428 denotes a film sensitivity detecting circuit shown as a block. These circuits transmit information necessary for photographing to the control circuit 425 through respective terminals. Reference numeral 429 denotes a lens driving circuit 429 shown as a block. Further, reference numeral 430 denotes a film driving circuit 430 shown as a block which feeds a photographic film under the control of the control circuit 425.

Next, the operation of the flash apparatus shown in FIG. 21 will be described together with the operation of the control circuit 425 with reference to the flowchart of FIG. 23. The description will be made on the assumption that all the components of the camera control circuit have been energized, and the control circuit 425 of the camera has been set to a low power consumption mode in this state and is out of operation.

When a power source switch in the switch circuit 422, which is operably connected to components such as the lens barrier of the camera, and the like, is turned on, the control circuit 425 of the microcomputer starts operation. The control circuit 425 applies a signal to the constant voltage circuit 420 through the VccEN terminal, and the constant voltage circuit 420 supplies the reference voltage Vref as well as the power source Vcc to the respective circuits.

Subsequent operations will be explained with reference to the flowchart of FIG. 23.

First, necessary initial settings are made to the microcomputer (step S1), and then the power source Vcc is applied to the switch circuit 422 (step S2).

When it is detected that a first switch SW1 (not shown) has been turned on by the depression of a release button to the first stroke position (semi-depressing operation) (step S3), a predetermined counter is set to an initial state (step S4), the battery is checked (step S5), and it is determined whether a power source is in a state necessary for photographing (step S6).

When it is determined that the power source is insufficient (NG), the process returns to step S2. Whereas, when it is determined that the power source is sufficient (OK), the distance measuring circuit 426 is operated by applying a signal to a terminal AFC, and the distance to a subject is measured (step S7). It is to be noted that distance measuring information is applied to the control circuit 425 through an AFD terminal.

Subsequently, the luminance of the subject is measured and the information thereof is supplied to the control circuit 425 through a terminal SP (step S8). Then, whether the luminance of the subject is brighter or darker than a predetermined degree of luminance is determined from the luminance data (step S9). When the luminance of the subject is lower than the predetermined degree of luminance, the process goes to a flash mode (step S10).

Figure 24:
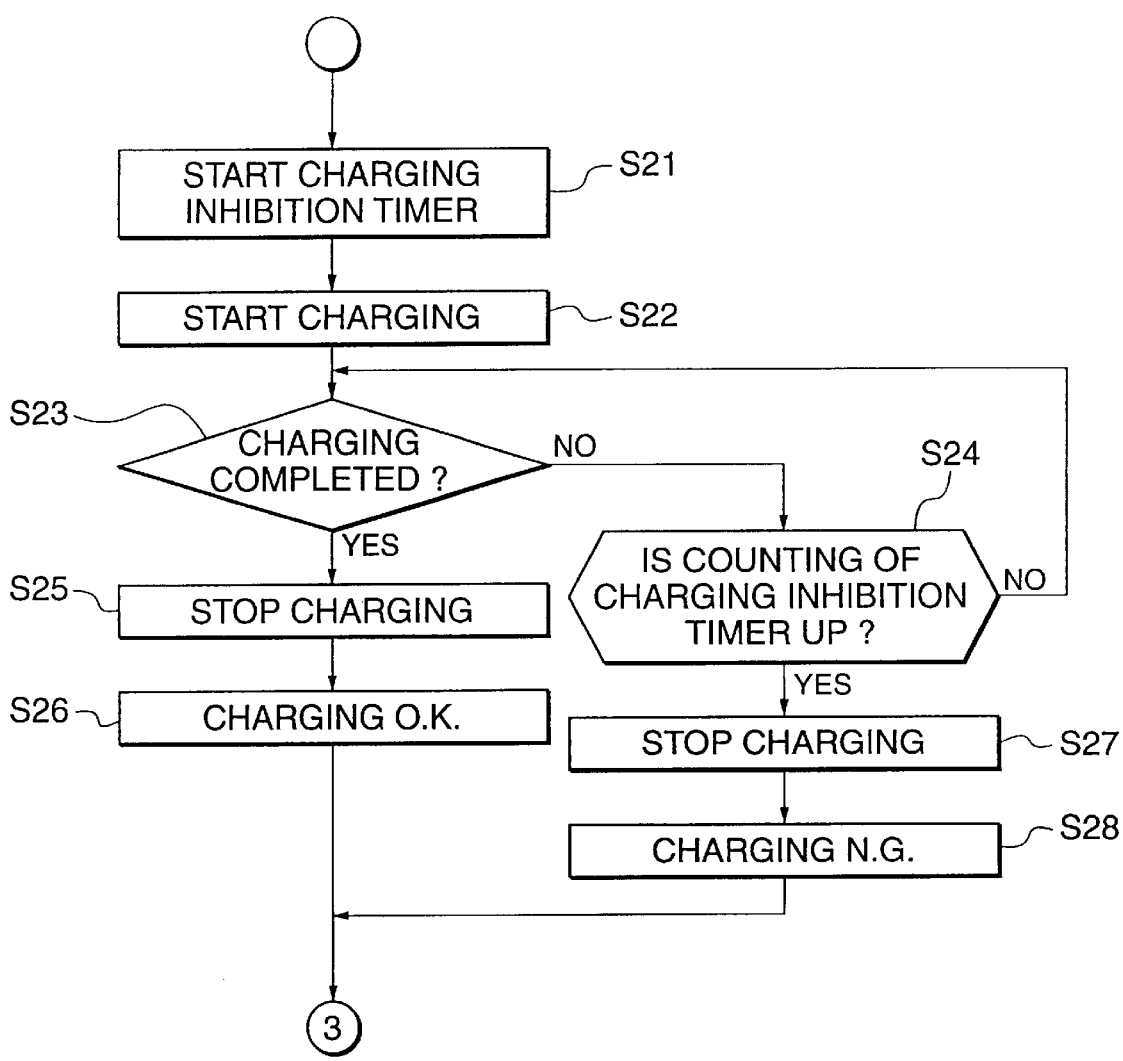
FIG. 24 is a flowchart showing the operation of the flash apparatus shown in FIG. 21.

The operation of the flash apparatus will be explained with reference to the flowchart shown in FIG. 24. In this mode, a charge inhibition timer as a timer for interrupting charging is operated (step S21). This timer is ordinarily operated for about 10 to 15 seconds.

Next, a high level signal is applied from the control circuit of the camera through a terminal a (A/D COM) to start oscillation, and further a low level signal is applied to a predetermined time terminal b (CGST). The low level signal is a pulse signal of several tens of microseconds. The high level signal applied to the terminal a acts as the base current of the transistor 308 through the resistor 305 so as to make the transistor 308 conductive.

As a result, one input terminal of the NOR circuit 310, which has been pulled up by the auxiliary power source Vcc through the resistor 307, becomes a low level. Further, the other input terminal of the NOR circuit 310 also becomes a low level by a one-shot signal which sets the terminal b to a low level for a predetermined period of time, whereby the output of the NOR circuit 310 becomes an H level, so that potential is applied to the resister 314.

Since this potential is connected to the gate terminal of the FET 313, the FET 313 acting as an oscillation transistor receives a gate driving voltage and is made conductive. The conduction of the FET 313 causes a current to flow from the battery 301 to the primary winding P of the oscillation transformer 312. As a result, electric power is induced in the secondary winding S of the oscillation transformer 312, which causes a current to flow to a loop composed of the high voltage rectifying diode 315, the main capacitor 320, and the rectifying element 316.

Since the cathode potential of the rectifying element 316 becomes about −0.7 V, a current flows from an auxiliary power source through the resistors 309 and 311. In other words, the voltage charged in the main capacitor 320, which flows from the anode of the rectifying element 316 to the cathode thereof, is partly divided and flows through the Vcc power source, and the resistors 309 and 311. When the resistance values of the resistors 309 and 311 are denoted by R9 and R11, it is preferable to set them to satisfy the following relationship:

(Vcc+0.7)×(R11/R9+R11)−0.7

That is, when it is assumed that the potential generated by the current divided to the resistor 311 is as large as the operation potential of the rectifying element 316 when it is in operation, the gate voltage, which is connected to the resistor 311, of the NOR gate 310 is cancelled thereby. That is, the resistor 11 acts as a protection device for preventing a drawback that the input gate of the NOR circuit 310 becomes negative by the operating voltage of the rectifying element 316 when the resistor 311 is not used.

It is to be noted that it is also possible to replace the resistor 11 with a diode. In this case, it is also possible to cancel the operating voltage of the rectifying element 316 by an operating voltage in the same way by connecting the anode of the diode to the resistor 309 and the cathode thereof to the cathode of the diode 316.

Therefore, since the potential connected to a midpoint between the resistor 309 and the resistor 11 becomes a low level by the flow of the charged voltage, the L level can be maintained even if an L level pulse applied to the terminal b for a predetermined period of time is finished.

The output from the control circuit of the camera connected to the terminal b is of an open collector type or an open drain type as described above. When the FET 313 acting as the oscillation transistor is continuously made conductive and the magnetic flux of the core of the oscillation transformer 312 is saturated, a counter electromotive force is generated and a charge current to the main capacitor 320 disappears so that no current flows to the resistors 309 and 311. Thus, one input of the NOR circuit 310 becomes an H level and the output thereof becomes an L level.

When the output of the NOR circuit 310 becomes the L level, the gate charge of the FET 313 becomes an L level and the FET 313 is made non-conductive momentarily. At this time, the rectifying element 316 receives a reverse bias by the capacitance of the high voltage rectifying diode 315 due to a counter electromotive force and generates potential which is higher than that of the auxiliary power source.

Thus, a capacitor may be connected to the rectifying element 316 in parallel therewith. Otherwise, it is also possible to protect the input terminal of the NOR circuit 310 by using a Zener diode having potential somewhat higher than that of the auxiliary power source as the rectifying diode.

When the magnetic flux of the core is reduced and the counter electromotive force is reversed to a forward oscillation voltage, the rectifying element receives a bias voltage again and the cathode potential thereof is reduced, whereby a current flows to the resistor 309 and 311 as described above and the input terminal of the NOR circuit 311 becomes an L level, which makes the FET 313 conductive again. Oscillation is executed by repeating the actions in above manner so that a charge having an increased voltage is accumulated in the main capacitor 320.

While the main capacitor 320 is charged as described above, it is determined in the sequence of FIG. 24 whether or not the voltage charged in the main capacitor 320 has been increased and a charge completion signal has been inputted from the voltage detecting circuit 317 through the terminal d (CGUP) (step S23).

When the charge completion signal has not been inputted, whether or not it is within a charge inhibition timer period is confirmed (step S4). When the charge completion signal has not been inputted and the charge inhibition timer has reached a completion count value (the charge inhibition timer has been counted up), the signal applied through the terminal a is stopped to thereby bring the voltage increasing operation of the flash apparatus to a stop (step S27), a charging NG flag indicting that charge is not completed is set (step S28), and thereafter the process returns to (3) of the flowchart of FIG. 23. It is to be noted that when the charge completion signal has not been inputted and the charge inhibition timer has not reached the completion count value, the process returns to step S23.

Figure 23:
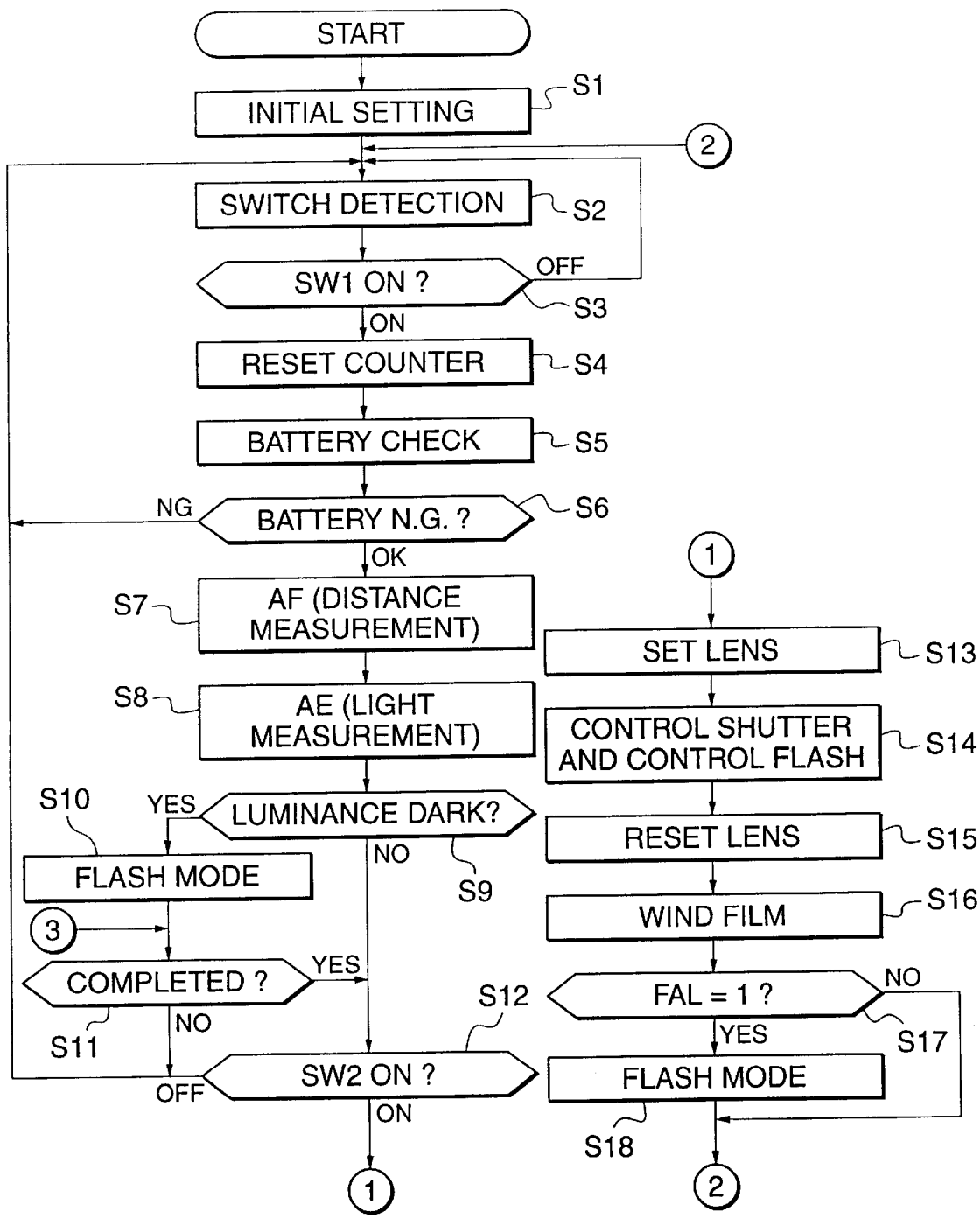
FIG. 23 is a flowchart showing the operation of the flash apparatus shown in FIG. 22.

In contrast, when the charge completion signal has been inputted at step S23, the signal applied to the terminal a is stopped (step S25), a charge completion flat is set, and the process returns to (3) of the flowchart of FIG. 23 (step S26).

When it is determined that the luminance of the subject is brighter than the predetermined value at step 9 of the flowchart of FIG. 23, it is determined whether or not a second switch SW2 (not shown), which is turned on by the depression the shutter button to the second stroke position (totally depressed), is turned on (step S12). When the second switch SW2 has been turned on, a focus is adjusted by controlling the lens driving circuit 429 based on the distance measurement data at step S7 (step S14).

Further, the opening of a shutter is controlled through the shutter circuit 423 based on the luminance of the subject obtained at step S8 and the conditions obtained from ISO sensitivity data as well as, when the flash apparatus is necessary because the luminance is low, the shutter is controlled by the distance measurement data and the ISO sensitivity, and the flash apparatus is emitted with a predetermined aperture value (step S14).

The flash apparatus is emitted by applying an H level signal to a terminal e (TRIG). When the H level signal is applied to the terminal e, a high voltage pulse is generated to the output of the trigger circuit 318 and applied to the trigger electrode of the discharge tube 319 so as to excite the discharge tube 319. The impedance of the discharge tube 319 is momentarily reduced by the excitation and the charged energy of the main capacitor 320 is discharged, and the subject is illuminated by converting the charged energy into light energy. It is to be noted that when the flash apparatus is used, a flash flag (FAL) is set to "1".

When the shutter is opened, a lens located at a focused position is returned to an initial position (step S15). After photographing has finished, the film driving circuit 430 is controlled to wind up a photographic film by one frame (S16).

Next, it is confirmed whether or not the flash flag 1 indicating that the flash apparatus has been used is set to "1" (S17).

When the flag is set to "1", the flash mode is employed, the main capacitor 320 is charged similarly to step S10, and a series of photographing sequences is completed. It is to be noted that, when the flash apparatus is not used, the process returns to step S2 bypassing step S18, and the series of the photographing sequences is completed.

It should be noted that the comparison circuit 304, which is an open collector type comparator, detects the voltage of the battery 301 through the resistor 302, compares the thus detected voltage with the reference voltage Vref which is applied from the constant voltage circuit 420 of the camera. When the detected voltage is equal to or less than the reference voltage Vref, the base current of the transistor 308 is bypassed to set the output thereof to an L level so that the transistor 308 is made non-conductive, and thus the input of the NOR circuit 310 is pulled up by the resistor 307. As a result, the output of the NOR circuit 310 is reversed to an L level, and it is stopped to supply the gate potential of the FET 313, which makes the FET 313 non-conductive. As a result, the potential of the battery 301 increases again, the positive input of the comparison circuit increases and the output thereof is made open again, which prevents the voltage of the battery 301 from being a voltage equal to or less than the reference voltage Vref. The capacitor 303 applies a certain degree of a hysteresis in time by the time constant of the resistor 302 and constitutes a time constant of about 1 to 2 microseconds. It is to be noted that the comparator 304 may be an element having a hysteresis in voltage.

The reference voltage Vref is set to a level capable of guaranteeing an auxiliary power source ability. Further, when the auxiliary power source is arranged to include a switching regulator, the reference voltage Vref is set to a level capable of guaranteeing the operation of the switching regulator.

Sixth Embodiment

Figure 25:
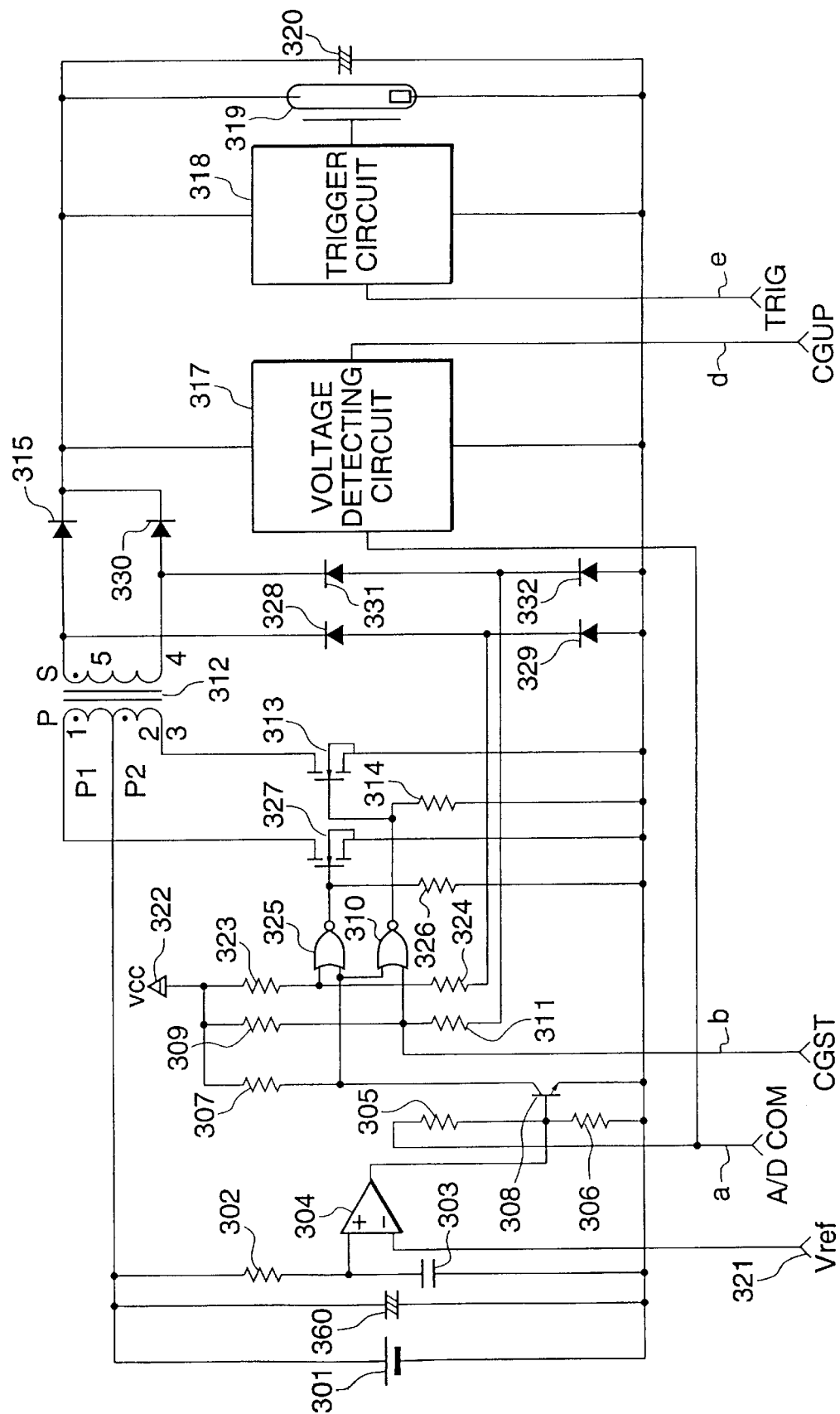
FIG. 25 is a circuit diagram of a flash apparatus as a sixth embodiment of the present invention.

FIG. 25 shows a sixth embodiment of the present invention.

The same reference numerals as used in FIG. 21 are used in FIG. 25 to denote constituent elements having the same functions as those of the constituent elements shown in FIG. 21.

The sixth embodiment is arranged as a push-pull type DC/DC converter, and constituent portions, which are added to the fifth embodiment, will be described. In the sixth embodiment, a NOR circuit 325 is provided in addition to the NOR circuit 310 shown in the fifth embodiment (first NOR circuit) as well as a second FET 327 and the like are provided in addition to the FET 313 (first FET).

Reference numerals 323 and 324 denote resistors, reference numeral 325 denotes the NOR circuit having one input pulled up from an auxiliary power source Vcc by the resistor 323. The resistor 324 acts as a protective resistor for protecting an input of the NOR circuit similarly to the above-mentioned resistor 311.

Reference numeral 326 denotes a resistor, and reference numeral 327 denotes a second FET acting as an oscillation transistor, and the resistor 326 is connected between the gate and source of the second FET 327 as a pull-down resistor.

An oscillation transformer 312 is arranged as a push-pull type transformer having a primary winding drawn out as P1 and P2 in comparison with the oscillation transformer shown in FIG. 21.

Reference numerals 328 and 331 denote reverse current prevention diodes, reference numerals 329 and 332 denote rectifying elements (corresponding to the rectifying element 316 shown in FIG. 21). A series circuit composed of the diode 328 and the rectifying element 329 is connected to one end of the secondary winding S of the oscillation transformer 312, and a series circuit composed of the diode 331 and the rectifying element 332 is connected to the other end of the secondary winding S thereof. A midpoint of the former series circuit is connected to one input of the second NOR circuit 325 through the resistor 324, and a midpoint of the latter series circuit is connected to one input of the first NOR circuit 310 through the resistor 311.

Reference numeral 330 denotes a second high voltage rectifying diode inserted between one end of the secondary winding S of the oscillation transformer 312 and a main capacitor 320.

Since the sequence of a camera is the same as that shown in FIGS. 23 and 24, only the operation of the flash apparatus will be described here while omitting the description of the photographing sequence of the camera.

When a control circuit of the camera determines that the flash apparatus must be charged, an H level signal is applied to an terminal a (A/DCOM). With this operation, a base current flows to a transistor 308 through a resistor 305. Thus, the transistor 308 is made conductive, so that one input terminal of each of the first and second NOR circuits 310 and 325 becomes a low level.

Further, an L level signal is inputted to a terminal b (CGST) for a predetermined period of time at approximately the same time. Accordingly, since both the inputs of the first NOR circuit 310 become an L level, the output thereof becomes an H level and gate potential is applied to the first FET 313. With this operation, the first FET 313 is made conductive. This conduction causes a current to flow from a battery 301 to the primary winding P2 of the oscillation transformer 312. This current causes a current to flow to the secondary winding S of the oscillation transformer 312 through a loop composed of a first high voltage rectifying diode 315, the main capacitor 320, and the diodes 331 and 332.

This current reduces the cathode potential of the rectifying diode 332 by an operating voltage, and the charged current of the main capacitor 320, which is the current outputted from the oscillation transformer 312, is caused to partially flow from the auxiliary power source Vcc through the resistors 309 and 311. When it is assumed that the auxiliary power source Vcc has a voltage of 5 V and the resistor 309 has a resistance of 22 KΩ, the resistor 324 has a resistance of about 3.3 KΩ, and the current, which is divided through the auxiliary power source Vcc, is a current of about 230 μA.

This current permits the input connected to a midpoint between the resistors 309 and 311 of the NOR circuit 310 to be maintained at an L level. A predetermined period of time, during which a terminal b is maintained at an L level to start oscillation, is a time during which a secondary output is stably generated from the oscillation transformer 321, and about several tens of microseconds are sufficient for this purpose, and the L level can be maintained by the secondary output.

When the FET 313 is continuously made conductive and the magnetic flux of the core of the oscillation transformer 321 is saturated, a charged current is exhausted and a counter electromotive force is generated. When the charged current is exhausted, since the forward bias current of the diode 331 disappears, an input of the first NOR circuit 310 becomes an H level. Thus, the output of the NOR circuit 310 becomes an L level, and the operation of the first FET 313 is stopped momentarily.

The counter electromotive force flows through a loop composed of the high voltage rectifying diode 330, the main capacitor 320, the rectifying element 329, and the diode 328, which reduces the anode potential of the rectifying element 329 by an operating voltage. Thus, since the charged voltage partly flows from the auxiliary power source Vcc through the resistors 323 and 324, one input of the second NOR circuit becomes an L level. Since the other input of the second NOR circuit 325 is connected to the collector of the transistor 308 and has become an L level, both the inputs thereof become an L level together. Thus, the output of the NOR circuit 325 becomes an H level, which makes the FET 327 conductive by applying gate potential thereto. Since the current flowing to the rectifying diode 332 is stopped, the first FET 313 sets the output of the first NOR circuit 310 to an L level.

When the second FET 327 is made conductive, a current flows to the primary winding P1 of the transformer 312. This current causes a current to flow to the secondary winding S through a loop composed of the second high voltage rectifying diode 330, the main capacitor 320, and the diodes 329 and 328. Thereafter, the saturation of the magnetic flux of the core of the oscillation transformer 312 makes the second NOR circuit 325 become an L level, similarly to the first NOR circuit 310, which momentarily stops the operation of the second FET 327. Here, an electromotive force flows to the diode 315, the main capacitor 320, and the diodes 332 and 331, which shifts the output of the NOR circuit 310 to an H level. This operation causes the second FET 327 and the first FET 313 to alternately repeat conduction and non-conduction so as to execute oscillation, whereby a charge having an increased voltage is accumulated in the main capacitor 320. Since subsequent operations are similar to those of the fifth embodiment, the description thereof is omitted.

Seventh Embodiment

Figure 27:
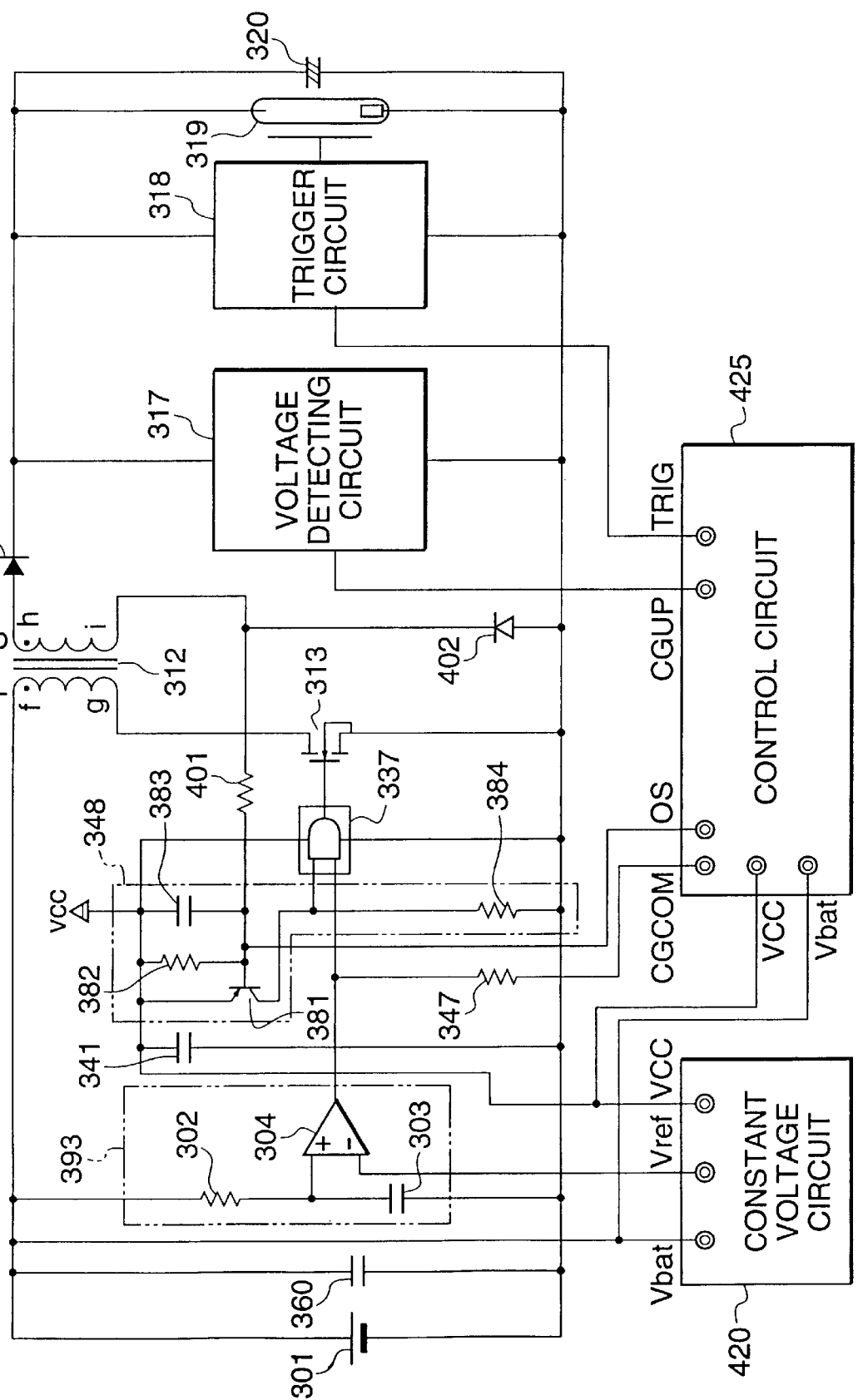
FIG. 27 is a circuit diagram of a flash apparatus as a seventh embodiment of the present invention.

FIG. 27 shows a seventh embodiment of the invention.

The seventh embodiment is similar to the conventional flash apparatus except that the seventh embodiment employs a resistor 401 and a diode 402.

The operation of the seventh embodiment is such that a loop for charging a main capacitor 320 is divided into a sub-loop through the base and emitter of a transistor 381 and the resistor 401 and a sub-loop bypassing to the diode 402, which greatly reduces a current through a constant voltage circuit 420.

For example, when the voltage of the constant voltage circuit 420 is denoted by Vreg, the current i flowing to the constant voltage circuit 420 is represented by the following formula.

$$i = (Vreg + VF - VBE)/R401$$

where:

VF: operating voltage of the diode 402,

R401: resistance value of the resistor 401, and

VBE: gate driving voltage of the transistor 381.

When the resistance value R401 is 10 kΩ and the voltage Vrge is about 5 V, it is possible to suppress the output of the constant voltage circuit 420 to about 500 μA.

It should be noted that the present invention is by no means limited to the above embodiments and may be variously modified according to design. For example, the flash apparatus of the present invention can also be applied to digital cameras, optical signal generation apparatuses used for optical communications, and the like.

What is Claimed is:

1. A flash apparatus comprising:
   a) a voltage boosting circuit having a transformer for boosting a battery voltage;
   b) a main capacitor to be charged by said voltage boosting circuit; and
   c) a control circuit for controlling starting and stopping of said voltage boosting circuit,
   wherein, when an oscillation of said voltage boosting circuit is stopped before said control circuit stops said voltage boosting circuit, said control circuit starts said voltage boosting circuit.

2. A flash apparatus comprising:
   a) a voltage boosting circuit having a transformer for boosting a battery voltage;
   b) a main capacitor to be charged by said voltage boosting circuit;
   c) a voltage detecting circuit for detecting a voltage of said main capacitor;
   d) a control circuit for controlling starting and stopping of said voltage boosting circuit; and e) an oscillation detecting circuit for detecting an oscillating state of said voltage boosting circuit, wherein, when said oscillation detecting circuit detects an oscillation stopping state of said voltage boosting circuit during a predetermined period of time before said control circuit stops said voltage boosting circuit, said control circuit starts said voltage boosting circuit.

3. A flash apparatus according to claim 2, wherein said oscillation detecting circuit detects a state of said voltage boosting circuit at timing of predetermined time intervals.

4. A flash apparatus according to claim 2, wherein said oscillation detecting circuit detects a state of said voltage boosting circuit at timing of time intervals of geometric progression.

5. A flash apparatus according to claim 2, wherein said oscillation detecting circuit detects a state of said voltage boosting circuit according to a voltage charged in said main capacitor.

6. A flash apparatus according to claim 2, wherein said oscillation detecting circuit includes a capacitor which is arranged to discharge electricity in response to detecting oscillation.

7. A flash apparatus according to claim 6, wherein an oscillation detection inputting position of said oscillation detecting circuit is a portion to which a driving signal for oscillation is inputted to an oscillation switch included in said voltage boosting circuit.

8. A flash apparatus according to claim 5, wherein said voltage detecting circuit detects the state of said voltage boosting circuit by measuring a voltage divided from the voltage charged in said main capacitor.

9. A flash apparatus according to claim 1 or 2, wherein said voltage boosting circuit has an oscillation transformer which does not include a feedback winding.

10. A flash apparatus according to claim 1 or 2, wherein said voltage boosting circuit has a power source voltage compensating circuit for returning a power source voltage to an initial state thereof, when the power source voltage drops, by temporarily interrupting the oscillation of said voltage boosting circuit.

11. A flash apparatus according to claim 1 or 2, wherein said voltage boosting circuit is a single forward voltage boosting circuit.

12. A flash apparatus according to claim 1 or 2, wherein said voltage boosting circuit is a push-pull voltage boosting circuit.

13. A flash apparatus according to claim 1 or 2, wherein said control circuit charges said main capacitor by controlling the oscillation of said voltage boosting circuit by inputting an oscillation continuing signal thereto as well as momentarily inputting an oscillation start signal thereto, and stops charging said main capacitor by stopping inputting the oscillation continuing signal.

14. A flash apparatus comprising:
a) a voltage boosting circuit having a transformer for boosting a battery voltage;
b) a main capacitor to be charged by said voltage boosting circuit;
c) a voltage detecting circuit for detecting a voltage of said main capacitor;
d) a control circuit for controlling starting and stopping of said voltage boosting circuit; and
e) an oscillation frequency detecting circuit for detecting an oscillation frequency of said voltage boosting circuit, wherein said control circuit compares the oscillation frequency of said voltage boosting circuit detected by said oscillation frequency detecting circuit with a reference frequency corresponding to a voltage charged in said main capacitor.

15. A flash apparatus according to claim 14, wherein said control circuit stops said voltage boosting circuit when the detected oscillation frequency of said voltage boosting circuit is not in approximate agreement with the reference frequency corresponding to the voltage charged in said main capacitor detected by said voltage detecting circuit.

16. A flash apparatus comprising:
a) a transformer composed of a primary winding and a secondary winding;
b) a switch element connected to the primary winding of said transformer for causing a current to flow from a battery to the primary winding;
c) a main capacitor to be charged by being connected to the secondary winding of said transformer;
d) an auxiliary power source to be created by said battery;
e) a circuit member to be driven by said auxiliary power source for controlling conduction and non-conduction of said switch element; and
f) a one-direction conduction element having an input terminal and an output terminal disposed in a charge loop of said transformer and said main capacitor, wherein an output end of said one-direction conduction element is connected to said auxiliary power source and said circuit member through a resistor, said switch element is made conductive through said circuit member in response to a voltage drop of the output end of said one-direction conduction element which is caused by a charged current flowing to a charge loop of a capacitor, and said switch element is made non-conductive through said circuit member by the charged current dropping and the output end of said one-direction conduction element being biased by said auxiliary power source.

17. A flash apparatus according to claim 16, wherein said switch element is an FET.

18. A flash apparatus according to claim 16, wherein said one-direction conduction element is a diode.

* * * * *

UNITED STATES PATENT AND TRADEMARK OFFICE
CERTIFICATE OF CORRECTION

PATENT NO. : 6,509,695 B2
DATED : January 21, 2003
INVENTOR(S) : Yukio Odaka et al.

It is certified that error appears in the above-identified patent and that said Letters Patent is hereby corrected as shown below:

Column 4,
Line 43, delete "voltage." and insert -- voltage --;

Column 5,
Line 15, after "becomes" insert -- "HL". --.
Line 15, before "Thereafter," insert a new paragraph.

Column 12,
Line 13, delete "terminal C" and insert -- terminal c --.

Signed and Sealed this

Twenty-third Day of September, 2003

JAMES E. ROGAN
*Director of the United States Patent and Trademark Office*